US010522868B2

(12) United States Patent
Kitoh et al.

(10) Patent No.: US 10,522,868 B2
(45) Date of Patent: Dec. 31, 2019

(54) BATTERY AND ASSEMBLY METHOD THEREFOR

(71) Applicant: NGK INSULATORS, LTD., Nagoya-shi, Aichi (JP)

(72) Inventors: Kenshin Kitoh, Nagoya (JP); Naohito Yamada, Nagoya (JP); Kenji Kawamura, Nagoya (JP); Yuichi Gonda, Nagoya (JP)

(73) Assignee: NGK INSULATORS, LTD., Nagoya-shi, Aichi (JP)

( * ) Notice: Subject to any disclaimer, the term of this patent is extended or adjusted under 35 U.S.C. 154(b) by 164 days.

(21) Appl. No.: 15/700,764

(22) Filed: Sep. 11, 2017

(65) Prior Publication Data
US 2017/0373298 A1 Dec. 28, 2017

Related U.S. Application Data

(63) Continuation of application No. PCT/JP2015/084300, filed on Dec. 7, 2015.

(30) Foreign Application Priority Data

Mar. 19, 2015 (JP) .................................. 2015-056315
Aug. 24, 2015 (JP) .................................. 2015-165111

(51) Int. Cl.
*H01M 10/04* (2006.01)
*H01M 10/34* (2006.01)
(Continued)

(52) U.S. Cl.
CPC ......... *H01M 10/0486* (2013.01); *H01M 2/08* (2013.01); *H01M 2/202* (2013.01);
(Continued)

(58) Field of Classification Search
CPC ........ H01M 10/0413; H01M 10/0486; H01M 10/281; H01M 10/30; H01M 10/345
(Continued)

(56) References Cited

U.S. PATENT DOCUMENTS

2012/0121992 A1* 5/2012 Friesen ................. H01M 4/382
429/403
2013/0065123 A1 3/2013 Tsuchida
2014/0315099 A1 10/2014 Yamada et al.

FOREIGN PATENT DOCUMENTS

EP 0 631 338 A1 12/1994
JP 07-057768 A 3/1995
(Continued)

OTHER PUBLICATIONS

International Search Report for PCT/JP2015/084300 (5 pgs).
Written Opinion for PCT/JP2015/084300 (7 pgs).

*Primary Examiner* — Basia A Ridley
*Assistant Examiner* — James M Erwin
(74) *Attorney, Agent, or Firm* — Flynn Thiel, P.C.

(57) ABSTRACT

The present invention provides a sequential and efficient method of assembling a battery with a desired number of layers while reliably separating positive and negative electrode sides from each other with one or more separator structures. According to the invention, the method of assembling a battery includes stacking one or multiple combinations each comprising a frame and a positive electrode plate to be disposed in a region defined by the frame and one or multiple combinations each comprising a frame and a negative electrode plate to be disposed in a region defined by the frame, once or alternately, such that the positive and adjacent negative electrode plates are separated from each other by a separator structure and the periphery of the separator structure is held between the adjacent frames. The separator
(Continued)

structure includes a separator exhibiting hydroxide ion conductivity and water impermeability.

5 Claims, 17 Drawing Sheets

(51) Int. Cl.
    *H01M 10/30*     (2006.01)
    *H01M 2/08*     (2006.01)
    *H01M 2/20*     (2006.01)
    *H01M 4/32*     (2006.01)
    *H01M 4/42*     (2006.01)
    *H01M 4/02*     (2006.01)

(52) U.S. Cl.
    CPC ......... *H01M 10/30* (2013.01); *H01M 10/345* (2013.01); *H01M 4/32* (2013.01); *H01M 4/42* (2013.01); *H01M 2004/027* (2013.01); *H01M 2004/028* (2013.01)

(58) Field of Classification Search
    USPC ........................................................ 429/152
    See application file for complete search history.

(56) References Cited

FOREIGN PATENT DOCUMENTS

| | | |
|---|---|---|
| JP | 2005-251465 A | 9/2005 |
| JP | 2009-266589 A | 11/2009 |
| JP | 2013-201037 A | 10/2013 |
| WO | WO 2013/118561 A1 | 8/2013 |

\* cited by examiner

BATTERY AND ASSEMBLY METHOD THEREFOR

CROSS-REFERENCE TO RELATED APPLICATIONS

This application is a continuation application of PCT/JP2015/084300 filed Dec. 7, 2015, which claims priority to Japanese Patent Application No. 2015-056315 filed Mar. 19, 2015 and Japanese Patent Application No. 2015-165111 filed Aug. 24, 2015, the entire contents all of which are incorporated herein by reference.

BACKGROUND OF THE INVENTION

1. Field of the Invention

The present invention relates to a battery and a method of assembling the same.

2. Description of the Related Art

Zinc secondary batteries, such as nickel-zinc secondary batteries, have been developed and studied over many years. Unfortunately, these batteries have not yet been put into practice. This is due to a problem that zinc contained in the negative electrode forms dendritic crystals, i.e. dendrites, during a charge mode of the battery and the dendrites break the separator to cause short circuit between the negative electrode and the positive electrode. Thus, a strong demand has arisen for a technique for preventing the short circuit caused by dendritic zinc in zinc secondary batteries, such as nickel-zinc secondary batteries.

In order to meet such a demand, batteries including hydroxide-ion-conductive ceramic separators have been proposed. For example, Patent Document 1 (WO2013/118561) discloses a nickel-zinc secondary battery including a separator composed of a hydroxide-ion-conductive inorganic solid electrolyte between a positive electrode and a negative electrode for preventing the short circuit caused by dendritic zinc, wherein the inorganic solid electrolyte is a layered double hydroxide (LDH) having a basic composition represented by the general formula: $M^{2+}_{1-x}M^{3+}_{x}(OH)_2$ $A^{n-}_{x/n}\cdot mH_2O$ (wherein $M^{2+}$ represents at least one type of divalent cation, $M^{3+}$ represents at least one type of trivalent cation, $A^{n-}$ represents an n-valent anion, n is an integer of 1 or more, and x is 0.1 to 0.4).

A stacked-cell battery made up of a plurality of unit cells is widely known for achieving output of high voltage and high current. A stacked-cell battery has a structure of a stack composed of a plurality of unit cells connected in series or parallel and is contained in a single battery container.

CITATION LIST

Patent Document

Patent Document 1: WO2013/118561

SUMMARY OF THE INVENTION

The applicant has already successfully developed a highly-densified ceramic separator (inorganic solid electrolyte separator) exhibiting hydroxide ion conductivity and yet water impermeability. The present applicant has also successfully formed such a ceramic separator on a porous substrate (e.g., an alumina porous substrate). The use of such a separator (or a separator provided with a porous substrate) in a secondary battery, such as a zinc-nickel battery, can prevent the short circuit caused by dendritic zinc. The maximization of such an effect requires reliable separation of the positive electrode side from the negative electrode side by a hydroxide-ion-conductive ceramic separator in a battery container. In particular, it is advantageous if a stacked-cell battery having such a configuration could be efficiently assembled from a plurality of unit cells to achieve high voltage and high current.

The inventors have recently found that a battery with a desired number of layers can be assembled sequentially and efficiently from one or more positive electrode plates, one or more negative electrode plates, and one or more separator structures exhibiting hydroxide ion conductivity and water impermeability, while the positive and negative electrode sides are reliably separated by the separator structures.

An object of the invention is to provide a sequential and efficient method of assembling a battery with a desired number of layers while positive and negative electrode sides are reliably separated from each other by one or more separator structures, and to provide such a battery.

One aspect of the present invention provides a method of assembling a battery, including the step of stacking one or multiple combinations each comprising a frame and a positive electrode plate to be disposed in a region defined by the frame and one or multiple combinations each comprising a frame and a negative electrode plate to be disposed in a region defined by the frame, once or alternately, such that the positive and adjacent negative electrode plates are separated from each other by a separator structure and the periphery of the separator structure is held between the adjacent frames,
  wherein the separator structure includes a separator, the separator exhibiting hydroxide ion conductivity and water impermeability; and
  wherein each of two end frames of the frames preliminarily has an end face plate to cover the region defined by the frame; or is disposed on a preliminarily disposed end face plate such that the region defined by the frame is covered by the end face plate; or is configured such that the region defined by the frame is covered by an end face plate after stacking, the stacked frames and the end face plates together thereby making up a single battery container.

Another aspect of the present invention provides a battery including:
  one or more positive electrode plates;
  one or more negative electrode plates provided oppositely to and/or alternately with the positive electrode plates;
  an electrolytic solution containing an aqueous alkali metal hydroxide;
  one or more separator structures, each provided between one of the positive electrode plates and the adjacent negative electrode plate to separate the positive and negative electrode plates and including a separator exhibiting hydroxide ion conductivity and water impermeability; and
  a battery container containing the positive and negative electrode plates, the separator structures, and the electrolytic solution,
  wherein the battery container includes two end face plates and a plurality of frames which are connected to each other between the two end face plates to ensure liquid tightness; and
  wherein the positive and negative electrode plates are disposed between the two end face plates and are separated by each separator structure, such that the periphery of each separator structure is held between two adjacent frames; and the positive or negative electrode plates are disposed within a region defined by the frames and between the separator structures and the end face plates and/or between the two adjacent separator structures.

DETAILED DESCRIPTION OF THE INVENTION

Battery and Method of Assembling the Same

The battery of the present invention includes one or more positive electrode plates; one or more negative electrode plates provided oppositely to and/or alternately with the positive electrode plates; an electrolytic solution containing an aqueous alkali metal hydroxide; one or more separator structures; and a battery container. The separator structures each include a separator exhibiting hydroxide ion conductivity and water impermeability, typical examples of which include ceramic separators (inorganic solid electrolyte separators), and are each provided between one of the positive electrode plates and the adjacent negative electrode plate to separate the positive and negative electrode plates. The battery container contains the positive and negative electrode plates, the separator structures, and the electrolytic solution. The battery of the invention is preferably fabricated in the form of a stacked-cell battery including two or more pairs of positive and negative electrode plates, in other words, two or more unit cells, but may be a single unit cell including one pair of positive and negative electrode plates. The stacked-cell battery may have either serial or parallel connection. The battery of the invention may either be a primary or secondary battery, but is preferably a secondary battery. The secondary battery may be of various types to which a hydroxide-ion-conductive separator is applicable, including nickel-zinc secondary batteries, silver oxide-zinc secondary batteries, manganese oxide-zinc secondary batteries, and various other alkaline-zinc secondary batteries. Nickel-zinc secondary batteries are particularly preferred.

Figure 1:
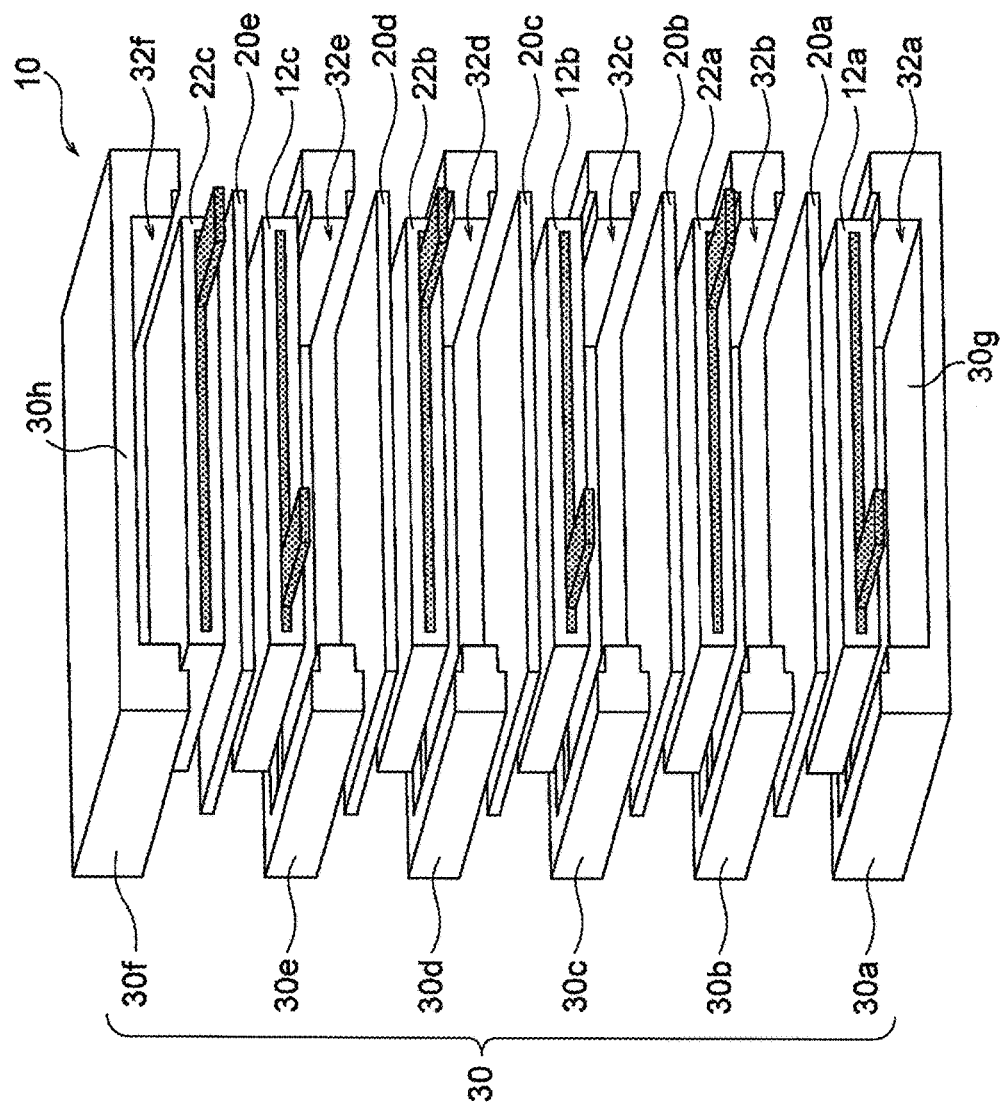
FIG. 1 is an exploded perspective view of a battery according to one embodiment of the invention.
Figure 2:
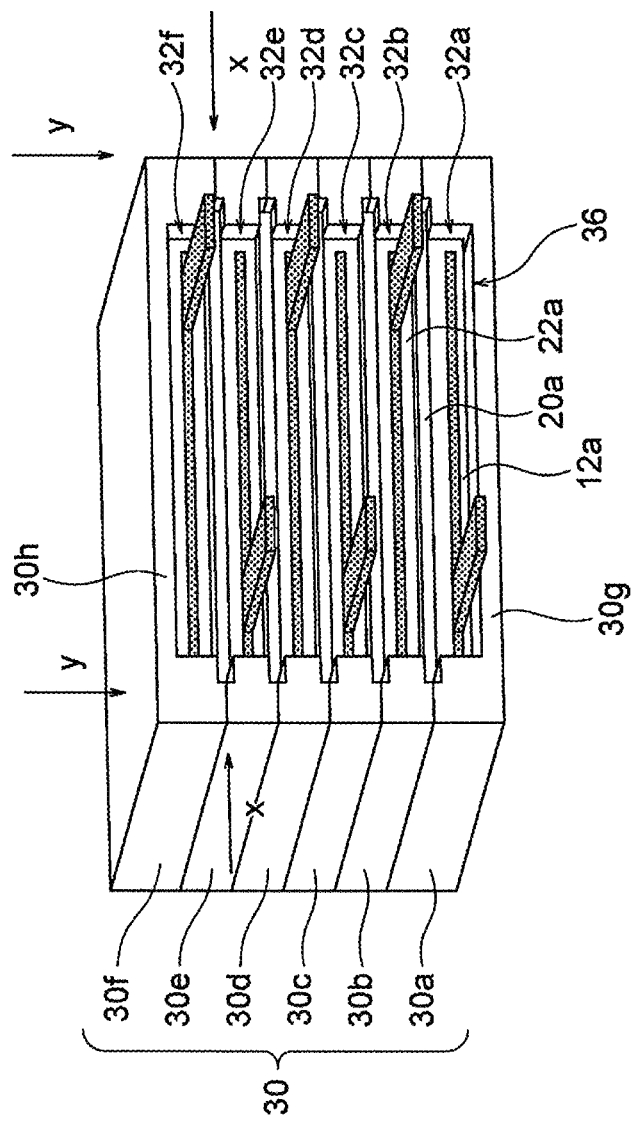
FIG. 2 is a perspective view of the horizontally stacked state of the battery of FIG. 1 immediately after assembly.
Figure 3:
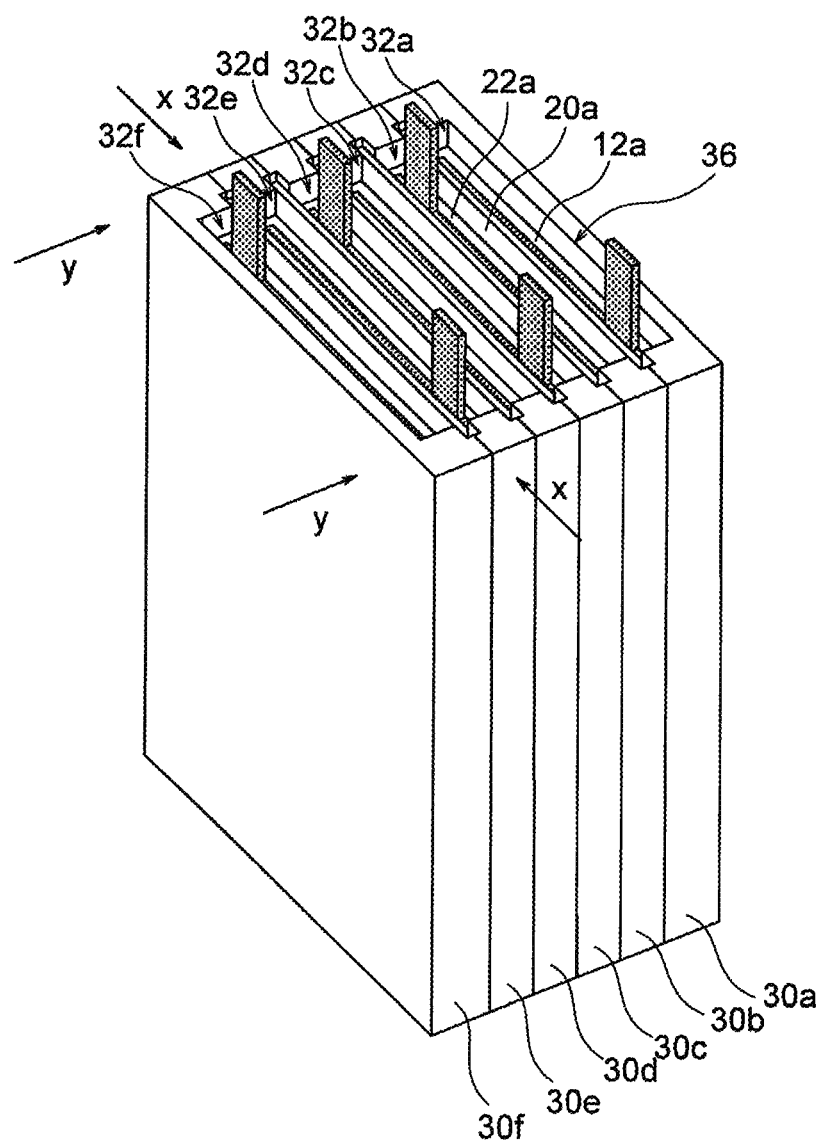
FIG. 3 is a perspective view of the vertically stacked state of the battery of FIG. 2, after rotating 90 degrees such that the opening is on the top.

FIG. 1 schematically shows an exploded perspective view of a battery according to one embodiment of the invention. FIG. 2 schematically shows a perspective view of the horizontally stacked state of the battery of FIG. 1 immediately after assembly; and FIG. 3 schematically shows a perspective view of the vertically stacked state of the battery of FIG. 2, after rotating 90 degrees such that the opening is on the top. The battery 10 shown in FIGS. 1 to 3 has an opening 36 and does not contain an electrolytic solution for convenience of explanation; however, it should be understood that the opening 36 of the battery as a final product is covered by a lid and the battery container 30 contains an electrolytic solution.

The battery 10 shown in FIGS. 1 to 3 includes a plurality of positive electrode plates 12a, 12b, and 12c and a plurality of negative electrode plates 22a, 22b, and 22c which are provided alternately with the positive electrode plates. The positive electrode plates 12a, 12b, and 12c may have an appropriate configuration depending on the type of the battery. For example, nickel-zinc secondary batteries may contain nickel hydroxide and/or nickel oxyhydroxide as a positive-electrode active material. The negative electrode plates 22a, 22b, and 22c may also have an appropriate configuration depending on the type of the battery. For example, various zinc secondary batteries may contain zinc, a zinc alloy, and/or a zinc compound as a negative-electrode active material. A plurality of separator structures 20a, 20b, 20c, 20d, and 20e, respectively, are disposed between the positive electrode plates 12a, 12b, and 12c and the adjacent negative electrode plates 22a, 22b, and 22c, such that the separator structures respectively separate the positive electrode plates 12a, 12b, and 12c and the adjacent negative electrode plates 22a, 22b, and 22c. The separator structures 20a, 20b, 20c, 20d, and 20e each include a separator exhibiting hydroxide ion conductivity and water impermeability, typically a material in a plate form. The positive electrode plates 12a, 12b, and 12c, the negative electrode plates 22a, 22b, and 22c, and the separator structures 20a, 20b, 20c, 20d, and 20e are contained in a battery container 30. The battery container 30 also contains an electrolytic solution (not shown) containing an aqueous alkali metal hydroxide.

Figure 4:
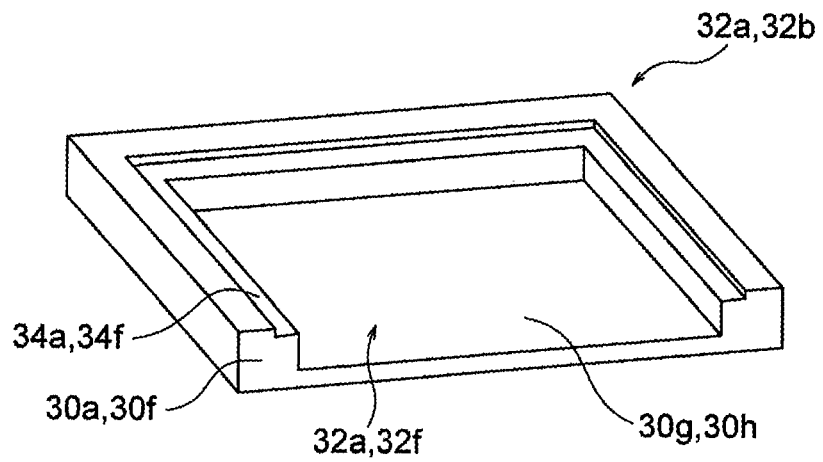
FIG. 4 is a perspective view of an integral component composed of a frame and an end face plate used in the battery shown in FIGS. 1 to 3.
Figure 5:
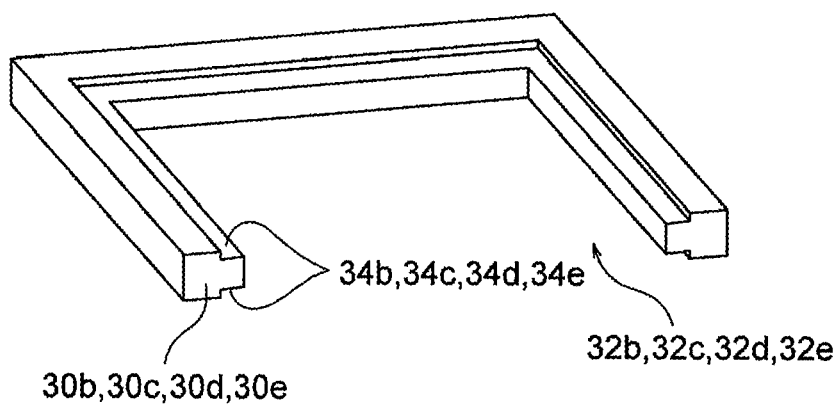
FIG. 5 is a perspective view of a frame used in the battery shown in FIGS. 1 to 3.

The battery container 30 is composed of two end face plates 30g and 30h and a plurality of frames 30a, 30b, 30c, 30d, 30e, and 30f which are connected to each other between the two end face plates 30g and 30h to ensure liquid tightness. The two end frames 30a and 30f may have end face plates 30g and 30h, respectively, which cover the regions respectively defined by the frames 30a and 30f. In such a case, the frame 30a and the end face plate 30g are preferably integrated, and/or the frame 30f and the end face plate 30h are preferably integrated, as shown in FIG. 4. Of course, the frames 30a and/or 30f may be separated from the end face plates 30g and/or 30h, respectively. The frames 30b, 30c, 30d, and 30e, which are not end frames, are connected to each other between the two end frames 30a and 30f to ensure liquid tightness, and preferably have a shape corresponding to the two end frames 30a and 30f, as shown in FIG. 5 (substantially U-shape in the drawing). As used herein, the term "substantially U-shape" is a generic term including both a U-shape with the corners in straight or substantially straight angles and a U-shape with round corners. As described above, the battery container 30 is an assembly composed of different components. The battery container 30 with such a configuration can be fabricated by the method of assembly of the invention as described below.

The battery container 30, i.e. the frames 30a, 30b, 30c, 30d, 30e, and 30f, and the end face plates 30g and 30h constituting it, is preferably made of resin. The resin for the resin container is preferably a resin having high resistance to alkali metal hydroxide, such as potassium hydroxide, more preferably a polyolefin resin, ABS resin, or modified polyphenylene ether, yet more preferably an ABS resin or a modified polyphenylene ether. The battery container 30, particularly in the form with the opening 36 covered by the lid, preferably has a structure with liquid tightness (preferably, liquid tightness and gas tightness). The battery container 30 preferably has extra positive-electrode spaces in the respective regions containing the positive electrode plates 12a, 12b, and 12c. The extra positive-electrode space has a volume that meets a variation in amount of water in association with the reaction at the positive electrode during the charge/discharge of the battery. Also, the battery container 30 preferably has extra negative-electrode spaces in the respective regions containing the negative electrode plates 22a, 22b, and 22c. The extra negative-electrode space has a volume that meets a variation in amount of water in association with the reaction at the negative electrode during the charge/discharge of the battery. The inside of the battery container 30 is divided by the separator structures 20a, 20b, 20c, 20d, and 20e with water impermeability into regions respectively containing the positive electrode plates 12a, 12b, and 12c and regions respectively containing the negative electrode plates 22a, 22b, and 22c. Such a configuration may result in a variation in amount of water in association with the reaction at positive and negative electrode chambers during charge/discharge of the battery, such as a nickel-zinc secondary battery, for example. Such a variation in amount of water can be effectively solved by the extra positive- and negative-electrode spaces, resulting in more reliable liquid tightness of the battery container 30. Detailed description of this issue will be provided below.

The method of assembling a battery according to the invention includes: the step of stacking multiple combinations respectively comprising the frames 30a, 30c, and 30e and the positive electrode plates 12a, 12b, and 12c to be disposed in regions respectively defined by these frames (i.e. the following pairs: the frame 30a and positive electrode plate 12a; the frame 30c and positive electrode plate 12b; and the frame 30e and positive electrode plate 12c) and multiple combinations respectively comprising the frames 30b, 30d, and 30f and the negative electrode plates 22a, 22b, and 22c to be disposed in regions respectively defined by these frames (i.e. the following pairs: the frame 30b and negative electrode plate 22a; the frame 30d and negative electrode plate 22b; and the frame 30f and negative electrode plate 22c), the multiple combinations being alternately stacked (hereinafter, referred to as "stacking step"). If the battery is a unit cell composed of a single pair of positive and negative electrode plates, unlike the battery shown in the drawing, the assembling is quit for one stacking step. The stacking step is performed such that the positive electrode plates 12a, 12b, and 12c and the adjacent negative electrode plates 22a, 22b, and 22c, respectively, are separated from each other by the separator structures 20a, 20b, 20c, 20d, and 20e, respectively, and the peripheries of the separator structures 20a, 20b, 20c, 20d, and 20e are held between the adjacent frames 30a, 30b, 30c, 30d, 30e, and 30f. Such a method allows sequential and efficient assembly of a battery with a desired number of layers from one or more positive electrode plates, one or more negative electrode plates, and one or more separator structures exhibiting hydroxide ion conductivity and water impermeability, while the positive and negative electrode sides are reliably separated from each other by the separator structures.

The two end frames 30a and 30f of the battery 30 (i) may have end face plates 30g and 30h, respectively, in advance to cover regions respectively defined by the frames 30a and 30f, as shown in FIG. 4; (ii) or may be disposed on preliminarily disposed end face plates 30g and 30h, respectively, such that the regions respectively defined by the frames 30a and 30f are covered by the end face plates 30g and 30h, respectively; or (iii) may be configured such that the regions respectively defined by the frames 30a and 30f, respectively, are covered by the end face plates 30g and 30h, respectively, after stacking. In any case, the stacked frames 30a, 30b, 30c, 30d, 30e, and 30f and the end face plates 30g and 30h together make up consequently a single battery container.

As described above, during the stacking step, the combinations respectively comprising the frames 30a, 30c, and 30e and the positive electrode plates 12a, 12b, and 12c (i.e. the following pairs: the frame 30a and positive electrode plate 12a; the frame 30c and positive electrode plate 12b; and the frame 30e and positive electrode plate 12c) and the combinations respectively including the frames 30b, 30d, and 30f and the negative electrode plates 22a, 22b, and 22c to be disposed in the regions defined by these frames (i.e. the following pairs: the frame 30b and negative electrode plate 22a; the frame 30d and negative electrode plate 22b; and the frame 30f and negative electrode plate 22c) are stacked alternately. During the stacking step, the frames 30a, 30b, 30c, 30d, 30e, and 30f are preferably disposed such that the outer faces thereof together form a continuous surface, in order to finally produce a battery container 30 as an integral form (preferably a casing).

The combinations respectively including the frames 30a, 30c, and 30e and the positive electrode plates 12a, 12b, and 12c to be disposed in the regions respectively defined by these frames may be produced by (i) disposing the positive electrode plates 12a, 12b, and 12c in the respective regions during or after the arrangement of the frames 30a, 30c, and 30e; (ii) by disposing the frames 30a, 30c, and 30e around the respective positive electrode plates 12a, 12b, and 12c after the arrangement of these positive electrode plates; or (iii) by disposing the frames 30a, 30c, and 30e having the respective positive electrode plates 12a, 12b, and 12c previously incorporated in the respective regions. Similarly, the combinations respectively including the frames 30b, 30d, and 30f and the negative electrode plates 22a, 22b, and 22c to be disposed in the regions respectively defined by these frames may be produced by (i) disposing the negative electrode plates 22a, 22b, and 22c in the respective regions during or after the arrangement of the frames 30b, 30d, and 30f; (ii) by disposing the frames 30b, 30d, and 30f around the respective negative electrode plates 22a, 22b, and 22c after the arrangement of these negative electrode plates; or (iii) by disposing the frames 30b, 30d, and 30f having the respective negative electrode plates 22a, 22b, and 22c previously incorporated in the respective regions.

The positive electrode plates 12a, 12b, and 12c and the negative electrode plates 22a, 22b, and 22c are stacked such that the positive and the adjacent negative electrode plates are separated from each other by one of the separator structures 20a, 20b, 20c, 20d, and 20e. This is achieved by performing the stacking such that the peripheries of the separator structures 20a, 20b, 20c, 20d, and 20e are held between the adjacent frames 30a, 30b, 30c, 30d, 30e, and 30f. In other words, during the stacking, the separator structures 20a, 20b, 20c, 20d, and 20e are preferably disposed such that the peripheries of the separator structures are each supported by the adjacent frames 30a, 30b, 30c, 30d, 30e, and 30f. In such a case, the separator structures 20a, 20b, 20c, 20d, and 20e are preferably disposed such that the ends of the separator structures reach the innermost parts of the adjacent frames 30a, 30b, 30c, 30d, 30e, and 30f (for example, the stepped portions 34a, 34b, 34c, 34d, 34e, and 34f, if present). Such an arrangement allows more reliable separation of the positive and negative electrode sides by the separator structures 20a, 20b, 20c, 20d, and 20e. In any case, the peripheries of the separator structures 20a, 20b, 20c, 20d, 20e are preferably spaced as little as possible from the adjacent frames 30a, 30b, 30c, 30d, 30e, and 30f in order to achieve adequate separator function.

In FIG. 1, the positive and negative electrode plates are stacked in the following order (from the bottom): the pair of the frame 30a and positive electrode plate 12a, the pair of the frame 30b and negative electrode plate 22a, the pair of the frame 30c and positive electrode plate 12b, the pair of the frame 30d and negative electrode plate 22b, the pair of the frame 30e and positive electrode plate 12c, and then the pair of the frame 30f and negative electrode plate 22c, i.e. the positive electrode plates 12a, 12b, and 12c are disposed or stacked prior to the corresponding negative electrode plates 22a, 22b, and 22c. The order of stacking, however, may be inverse. For example, the positive and negative electrode plates may be stacked in the following order (from the bottom): the pair of the frame 30a and negative electrode plate 22a, the pair of the frame 30b and positive electrode plate 12a, the pair of the frame 30c and negative electrode plate 22b, the pair of the frame 30d and positive electrode plate 12b, the pair of the frame 30e and negative electrode plate 22c, and then the pair of the frame 30f and positive electrode plate 12c, i.e. the negative electrode plates 22a, 22b, and 22c may be disposed or stacked prior to the corresponding positive electrode plates 12a, 12b, and 12c. Accordingly, while the description below is based on a configuration in which the positive electrode plates 12a, 12b, and 12c are disposed prior to the corresponding negative electrode plates 22a, 22b, and 22c, as shown in FIG. 1, it goes without saying that the positive electrode plates 12a, 12b, and 12c and the corresponding negative electrodes 22a, 22b, and 22c may be mutually replaced.

According to a preferred embodiment of the invention, the frames 30a, 30b, 30c, 30d, 30e, and 30f respectively have cutouts 32a, 32b, 32c, 32d, 32e, and 32f, and are stacked such that all of the cutouts 32a, 32b, 32c, 32d, 32e, and 32f of the frames 30a, 30b, 30c, 30d, 30e, and 30f are positioned at the same side. As a result, the cutouts 32a, 32b, 32c, 32d, 32e, and 32f together provide the battery container with an opening 36. In such a case, the frames 30a, 30b, 30c, 30d, 30e, and 30f respectively having the cutouts 32a, 32b, 32c, 32d, 32e, and 32f preferably have a substantially U-shape, which provides a battery container 30 in the form of a casing having an opening 36. The substantially U-shape facilitates arrangement or insertion of the positive electrode plates 12a, 12b, and 12c, the negative electrode plates 22a, 22b, and 22c, and the separator structures 20a, 20b, 20c, 20d, and 20e into the frames 30a, 30b, 30c, 30d, 30e, and 30f, and also facilitates injection of an electrolytic solution into the battery container 30. Further, the battery container 30 in the form of a casing with an opening 36 provides a battery which can be stably placed. After the battery container 30 is completed, the opening 36 is preferably covered by a lid (not shown). The joint portion of the lid and the opening 36 is preferably sealed in order to ensure liquid tightness.

The positive electrode plates 12a, 12b, and 12c, the negative electrode plates 22a, 22b, and 22c, the separator structures 20a, 20b, 20c, 20d, and 20e, the frames 30a, 30b, 30c, 30d, 30e, and 30f, and the end face plates 30g and 30h (hereinafter, referred to as components) each may be disposed either horizontally or vertically. In other words, the components each may be disposed horizontally, resulting in upward stacking, as shown in FIGS. 1 and 2. In such a case, the method of the invention preferably includes the step of rotating the battery container 30, such that the opening 36 is on the top, from the viewpoint of injection and retention of the electrolytic solution. Alternatively, the components of the battery 10 each may be disposed vertically, resulting in sideward stacking, as shown in FIG. 3. Preferably, the components are each disposed horizontally, as shown in FIGS. 1 and 2, which inhibits misalignment of the components to be stacked, allowing more stable process of assembly.

An electrolytic solution (not shown) is injected inside the battery container 30, specifically in the regions respectively containing the positive electrode plates 12a, 12b, and 12c and the regions respectively containing the negative electrode plates 22a, 22b, and 22c in the battery container 30. The electrolytic solution contains an aqueous alkali metal hydroxide. If the components are each disposed horizontally, resulting in upward stacking, as shown in FIGS. 1 and 2, the completed battery container 30 is preferably rotated such that the opening 36 is on the top, in order to facilitate injection of the electrolytic solution. As described above, the opening 36 is preferably covered by a lid (not shown) after the completion of the battery container 30, but the electrolytic solution may be injected before the opening 36 is covered by a lid, or may be injected after the covering by the lid via an injection hole provided in the lid or any other portion. The injection hole is preferably sealed or closed with any material (such as resin) after injection of the electrolytic solution.

According to a preferred embodiment of the invention, the frames 30a, 30b, 30c, 30d, 30e, and 30f respectively have stepped portions 34a, 34b, 34c, 34d, 34e, and 34f where the frames have a height lower by at least one step along the inner edge of the frames, as shown in FIGS. 4 and 5. The separator structures 20a, 20b, 20c, 20d, and 20e may be disposed such that the peripheries of the separator structures overlap with the stepped portions 34a, 34b, 34c, 34d, 34e, and 34f, respectively. The frames preferably have two stepped portions in total, one at the upper part and the other at the lower part, along the inner edge of the frames, as shown by the frames 30b, 30c, 30d, and 30e in FIG. 5. The frames, however, may have a stepped portion only at either the upper part or the lower part, as shown by the frames 30a and 30f in FIG. 4. In such a configuration, the stepped portions 34a, 34b, 34c, 34d, 34e, and 34f help bonding of the peripheries of the separator structures 20a, 20b, 20c, 20d, and 20e to ensure liquid tightness using an adhesive or by thermal bonding, resulting in significant inhibition of migration of Zn contained in the electrolytic solution at the negative electrode side to the positive electrode side. It in turn provides effective inhibition of growth of zinc dendrites due to the migration of Zn towards the positive electrode side, which undesirably occurs if the negative electrode plates 22a, 22b, and 22c contain zinc. Alternatively, the separator structures 20a, 20b, 20c, 20d, and 20e need not be bonded to the stepped portions 34a, 34b, 34c, 34d, 34e, and 34f. In such a case, a micro gap which may inevitably be formed between the stepped portions 34a, 34b, 34c, 34d, 34e, and 34f and the separator structures 20a, 20b, 20c, 20d, and 20e has a circumventing shape, which gives Zn migrating through the microgap, if any, a very long migration distance, to delay or inhibit the growth of zinc dendrites caused by migration of Zn to the positive electrode side.

According to a preferred embodiment of the invention, (i) the adjacent frames 30a, 30b, 30c, 30d, 30e, and 30f are bonded to each other to ensure liquid tightness; and/or (ii) the end face plates 30g and 30h and the frames 30a and 30f are bonded to ensure liquid tightness; and/or (iii) the frames 30a, 30b, 30c, 30d, 30e, and 30f and the peripheries of the separator structures 20a, 20b, 20c, 20d, and 20e are bonded to ensure liquid tightness, during the stacking step. In other words, in such an embodiment, assembly of each layer of the battery container 30 involves adhesion. In this embodiment, the bonding during the stacking step is preferably performed through at least any one technique selected from the group consisting of adhesion with an adhesive, thermal bonding and solvent bonding. Epoxy-resin adhesives are preferred in view of its high alkali resistance. Hot-melt adhesives may also be used. The thermal bonding in the stacking step may be performed through any known technique, such as laser welding, thermocompression bonding, hot plate welding, ultrasonic welding, high-frequency welding, or thermal welding (e.g., welding by pressing in a heated mold or die (e.g., metal mold or die), or welding by heating with a soldering iron). Laser welding is particularly preferred in that it allows reliable and efficient adhesion. Laser welding during the stacking step is preferably performed such that a laser beam is incident on bonding surfaces of the frames 30a, 30b, 30c, 30d, 30e, and 30f (a substantially U-shaped end face in the drawing) in a substantially perpendicular direction (e.g. y-direction in FIGS. 2 and 3) or substantially parallel direction (e.g. x-direction in FIGS. 2 and 3) to melt the bonding sites. In this case, the frames 30a, 30b, 30c, 30d, 30e, and 30f, and/or the end face plates 30g and 30h are preferably composed of a resin which can be molten by a laser beam irradiation (e.g. thermoplastic resins). In particular, if a laser beam is incident on the bonding surfaces of the frames 30a, 30b, 30c, 30d, 30e, and 30f (substantially U-shaped end face in the drawing) in a substantially perpendicular direction (e.g. y-direction in FIGS. 2 and 3) to melt the bonding sites, the bonding requires the laser beam (from above, for example in FIGS. 1 and 2) to penetrate the frames 30a, 30b, 30c, 30d, 30e, and 30f and/or the end face plates 30g and 30h to cause local thermal melting at the bonding interface. It should be understood that the resin is preferably any resin having resistance to alkali metal hydroxide, such as potassium hydroxide, contained in the electrolytic solution, since it forms the battery container 30 containing the electrolytic solution. Other preferred techniques to adhere resins include solvent bonding. Solvent bonding is a method of adhesion by dissolving resins to be bonded with an organic solvent and then combining the molten resins. In solvent bonding, the solvent is readily volatilized and is dried in several seconds to several tens of seconds, without residues. The solvent used in solvent bonding may be appropriately determined depending on the material of the resin to be bonded and taking solubility of the resin and volatility of the solvent into consideration. For example, methyl ethyl ketone (MEK) is preferred in solvent bonding of ABS resins, and dichloromethane is preferred in solvent bonding of PET resins.

According to another preferred embodiment of the invention, the method of the invention may include (i) bonding the adjacent frames 30a, 30b, 30c, 30d, 30e, and 30f to ensure liquid tightness; and/or (ii) bonding the frames 30a and 30f and the end face plates 30g and 30h to ensure liquid tightness, and/or (iii) bonding the adjacent frames 30a, 30b, 30c, 30d, 30e, and 30f and the peripheries of the separator structures 20a, 20b, 20c, 20d, and 20e to ensure liquid tightness, after the stacking step. The adhesion in this embodiment is preferably performed by thermal bonding. The thermal bonding may be performed through any known technique, such as laser welding, thermocompression bonding, hot plate welding, ultrasonic welding, high-frequency welding, or thermal welding (e.g., welding by pressing in a heated mold or die (e.g., metal mold or die, or welding by heating with a soldering iron). Laser welding is particularly preferred in that it allows reliable and efficient adhesion. Laser welding after the stacking step is preferably performed such that a laser beam is incident on the bonding surfaces of the frames 30a, 30b, 30c, 30d, 30e, and 30f (a substantially U-shaped end face in the drawing) in a substantially parallel direction (e.g. x-direction in FIGS. 2 and 3) and/or the bonding surfaces between the end face plates 30g and 30h and the frames 30a and 30f adjacent to these end face plates to melt the bonding sites. In this case, the frames 30a, 30b, 30c, 30d, 30e, and 30f, and/or the end face plates 30g and 30h are preferably composed of a resin which can be molten by a laser beam irradiation (e.g. thermoplastic resins). It should be understood that the resin is preferably any resin having resistance to alkali metal hydroxide, such as potassium hydroxide, contained in the electrolytic solution, since it forms the battery container 30 containing the electrolytic solution.

In any embodiment including adhesion by thermal bonding, a resin capable of being softened or molten during the thermal bonding is preferably disposed between the adjacent frames 30a, 30b, 30c, 30d, 30e, and 30f or near the joint of these frames, and/or between the end face plates 30g and 30h and the frames 30a and 30f adjacent to the end face plates, or near the joint of the end face plates, such that the resin is softened or molten during the thermal bonding to facilitate or enhance the bonding. Any resin may be used that can be softened or molten during thermal bonding, and thermoplastic resins are preferred. In particular, in the case of thermal bonding by laser welding, the resin is preferably capable of efficiently absorbing the laser beam to convert it into heat (e.g. resins containing or coated with a colorant). The resin which is softened or molten during the thermal bonding may be disposed on or near a bonding site in any form such as a sheet or tape. For example, a sheet or tape resin is preferred in that it is readily held between components to be bonded together. Alternatively, a linear, sheet, or tape resin may be disposed along the circumference of the joint, such that it enters the joint during the thermal bonding.

Figure 6:
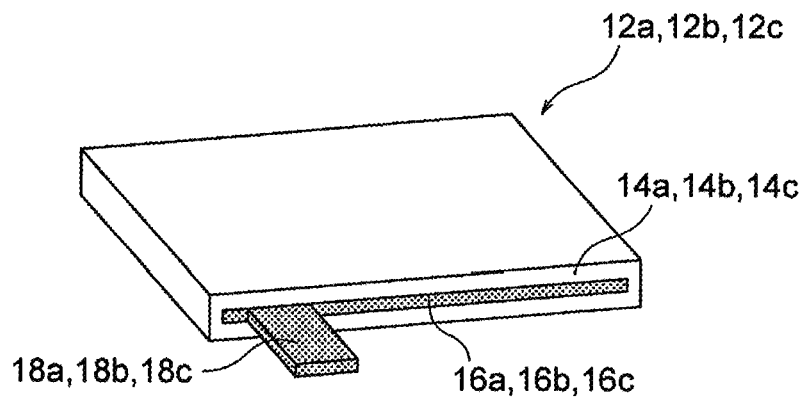
FIG. 6 is a perspective view of a positive electrode plate used in the battery shown in FIGS. 1 to 3.
Figure 8:
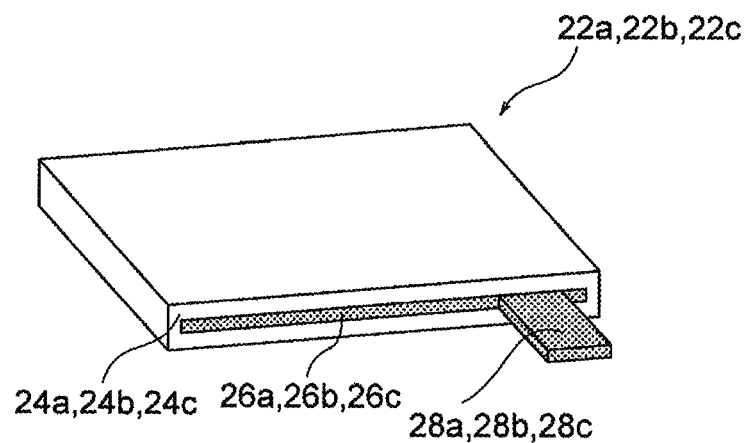
FIG. 8 is a perspective view of a negative electrode plate used in the battery shown in FIGS. 1 to 3.

The positive electrode plates 12a, 12b, and 12c may be appropriately selected depending on the type of battery. For example, a nickel-zinc secondary battery may contain nickel hydroxide and/or nickel oxyhydroxide as positive-electrode active materials. Preferably, the positive electrode plates 12a, 12b, and 12c respectively include positive-electrode active materials 14a, 14b, and 14c and positive-electrode current collectors 16a, 16b, and 16c supporting the positive-electrode active materials 14a, 14b, and 14c, as shown in FIG. 6. The negative electrode plates 22a, 22b, and 22c may also be composed of an appropriate material depending on the type of battery. For example, various zinc secondary batteries may contain zinc, a zinc alloy, and/or a zinc compound as positive-electrode active material. Preferably, the negative electrode plates 22a, 22b, and 22c respectively include negative-electrode active materials 24a, 24b, and 24c and negative-electrode current collectors 26a, 26b, and 26c supporting the negative-electrode active materials 24a, 24b, and 24c, as illustrated in FIG. 8. Preferably, the battery 10 is a nickel-zinc battery in which the positive-electrode active materials 14a, 14b, and 14c contain nickel hydroxide and/or nickel oxyhydroxide and the negative-electrode active materials 24a, 24b, and 24c contain zinc, a zinc alloy, and/or a zinc compound.

The positive electrode plates 12a, 12b, and 12c and the negative electrode plates 22a, 22b, and 22c are preferably configured such that the upper edges of the positive electrode plates 12a, 12b, and 12c and those of the negative electrode plates 22a, 22b, and 22c are lower than the upper edge of the battery container 30 when the battery container is placed such that the opening 36 is on the top.

The positive-electrode current collectors 16a, 16b, and 16c preferably have positive-electrode current collector extensions 18a, 18b, and 18c protruding from the opening 36 (or from a slit provided in or near a lid, for example, after the opening 36 is covered by the lid) to the outside of the battery container 30. The negative-electrode current collectors 26a, 26b, and 26c preferably have negative-electrode current collector extensions 28a, 28b, and 28c protruding from the opening 36 (or from a slit provided in or near a lid, for example, after the opening 36 is covered by the lid) to the outside of the battery container 30. The positive-electrode current collector extensions 18a, 18b, and 18c and the negative-electrode current collector extensions 28a, 28b, and 28c may be each provided at a desired position, which helps production of terminals of the battery 10. For example, in FIGS. 1 to 3, the positive-electrode current collector extensions 18a, 18b, and 18c are arranged to form a line at one position and the negative-electrode current collector extensions 28a, 28b, and 28c are arranged to form a line at another position. This configuration is advantageous for production of terminals. It should be noted that the slit or the like provided in or near the lid for allowing the positive-electrode current collector extensions 18a, 18b, and 18c and the negative-electrode current collector extensions 28a, 28b, and 28c to extend outside the battery container 30 is preferably sealed with a material such as a resin to ensure liquid tightness.

Figure 7:
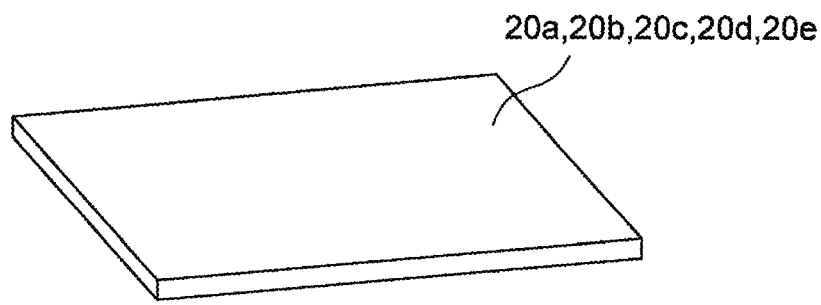
FIG. 7 is a perspective view of a separator structure used in the battery shown in FIGS. 1 to 3.

The separator structures 20a, 20b, 20c, 20d, and 20e each include a separator exhibiting hydroxide ion conductivity and water impermeability (preferably water impermeability and gas impermeability), and typically have a plate shape as shown in FIG. 7. In other words, the main part of the separator structures 20a, 20b, 20c, 20d, and 20e is constituted by a separator exhibiting hydroxide ion conductivity and water impermeability. The separator is in the form of a plate, membrane, or layer densified enough to have water impermeability (preferably water impermeability and gas impermeability), and is composed of a hydroxide-ion-conductive material. As used herein, the term "water impermeability" indicates that water in contact with one surface of an analyte (e.g., the LDH membrane and/or the porous substrate) does not reach the other surface during the "density evaluation test I" performed in Example 1 described below or any other equivalent method or system. Typical examples of such a separator include ceramic separators (inorganic solid electrolyte separators). The separator structures 20a, 20b, 20c, 20d, and 20e are provided at respective positions between the positive and adjacent negative electrode plates so as to separate the positive and adjacent negative electrode plates.

The separator structures 20a, 20b, 20c, 20d, and 20e are each provided so as to separate the positive electrode plates 12a, 12b, and 12c and the adjacent negative electrode plates 22a, 22b, and 22c. The separator constituting the main part of the separator structures 20a, 20b, 20c, 20d, and 20e preferably exhibits hydroxide ion conductivity and water impermeability (preferably water impermeability and gas impermeability). In other words, the water and gas impermeability of the separator indicates that the separator constituting the main part of the separator structures 20a, 20b, 20c, 20d, and 20e has a density sufficiently high to prevent the permeation of water or gas and is not a porous film or any other porous material having water or gas permeability. Thus, in the case of a zinc secondary battery, this configuration is very effective for physically inhibiting the penetration of dendritic zinc (which may be formed during a charge mode of the battery) through the separator, to prevent the short circuit between the positive and negative electrodes. In any case, the hydroxide ion conductivity of the separator leads to efficient migration of hydroxide ions necessary between the positive electrode side and the negative electrode side, resulting in charge/discharge reaction in the positive and negative electrodes.

The separator structures 20a, 20b, 20c, 20d, and 20e each may have an outer frame (not shown) along their circumference. Preferably, one or more separators are fitted or connected in and/or on the outer frames and the outer frames are engaged with the frames 30a, 30b, 30c, 30d, 30e, and 30f. Alternatively, a bar may be provided inside the outer frame and a plurality of separators may be individually fitted or connected in a plurality of window-shaped regions defined by the outer frame and the bar. The outer frames and the bars (if present) are preferably composed of a dense material with water impermeability (preferably water impermeability and gas impermeability) to provide separator structures 20a, 20b, 20c, 20d, and 20e that generally exhibit water impermeability (preferably water impermeability and gas impermeability). The joint portion of the outer frame with the bar (if present) and the separator is preferably sealed with an adhesive, for example, so as to ensure liquid tightness. The dense material for the outer frame and the bar (if present) is preferably ceramic or resin, but is preferably resin in that it helps adhesion in the case of resin battery container 30. In any case, the dense material is required to have resistance to the electrolytic solution, that is, high alkali resistance. Preferred examples of the ceramic material include alumina, zirconia, titania, magnesia, spinel, calcia, cordierite, zeolite, mullite, ferrite, zinc oxide, silicon carbide, and any combination thereof. More preferred are alumina, zirconia, titania, and any combination thereof. Particularly preferred are alumina and zirconia and any combination thereof. The resin preferably has resistance to alkali metal hydroxide such as potassium hydroxide, and is more preferably a polyolefin resin, ABS resin, or modified polyphenylene ether, yet more preferably an ABS resin or modified polyphenylene ether. For example, if the battery container 30 is made of resin, the outer frames and the bars may be composed of the same resin as the battery container 30. If the battery container 30 is made of resin and the outer frames of the separator structures 20a, 20b, 20c, 20d, and 20e are composed of the same or a different resin (preferably the same resin), bonding with the battery container 30, i.e. the frames 30a, 30b, 30c, 30d, 30e, and 30f constituting the battery container 30, with an adhesive or by thermal bonding (e.g. laser welding) is advantageously easier.

The separator is preferably composed of an inorganic solid electrolyte exhibiting hydroxide ion conductivity. The inorganic solid electrolyte is preferably in a plate, membrane, or layer form. The use of the separator composed of a hydroxide-ion-conductive inorganic solid electrolyte as the separator separates the electrolytic solutions between the positive and negative electrodes, and ensures conduction of hydroxide ions. The inorganic solid electrolyte is desirably densified to exhibit water impermeability (preferably water impermeability and gas impermeability). For example, the inorganic solid electrolyte has a relative density of preferably 90% or more, more preferably 92% or more, still more preferably 95% or more, as determined by the Archimedes method. The density may be any value so long as the inorganic solid electrolyte is dense and hard enough to prevent the penetration of dendritic zinc. Such a dense and hard inorganic solid electrolyte may be produced through hydrothermal treatment. Thus, a green compact which has not undergone hydrothermal treatment is not suitable as the inorganic solid electrolyte in the present invention because the compact is not dense but brittle in the solution. Any process other than hydrothermal treatment may be used for producing a dense and hard inorganic solid electrolyte.

The separator or the inorganic solid electrolyte may be in the form of a composite body containing particles of an organic solid electrolyte exhibiting hydroxide ion conductivity and an auxiliary component that promotes the densification or hardening of the particles. Alternatively, the separator may be in the form of a composite body containing a porous body serving as a substrate and an inorganic solid electrolyte (e.g., a layered double hydroxide) that is precipitated and grown in pores of the porous body. Examples of the materials of the porous body include ceramic materials, such as alumina and zirconia; and insulating materials, such as porous sheets composed of foamed resin or fibrous material.

The inorganic solid electrolyte preferably contains a layered double hydroxide (LDH) having a basic composition represented by the general formula: $M^{2+}_{1-x}M^{3+}_{x}(OH)_2 A^{n-}_{x/n} \cdot mH_2O$ (wherein $M^{2+}$ represents a divalent cation, $M^{3+}$ represents a trivalent cation, $A^{n-}$ represents an n-valent anion, n is an integer of 1 or more, x is 0.1 to 0.4, and m is 0 or more). The inorganic solid electrolyte is more preferably composed of such an LDH. In the general formula, $M^{2+}$ may represent any divalent cation, and is preferably $Mg^{2+}$, $Ca^{2+}$ or $Zn^{2+}$, more preferably $Mg^{2+}$. $M^{3+}$ may represent any trivalent cation, and is preferably $Al^{3+}$ or $Cr^{3+}$, more preferably $Al^{3+}$. $A^{n-}$ may represent any anion, and is preferably $OH^-$ or $CO_3^{2-}$. In the general formula, preferably, $M^{2+}$ comprises $Mg^{2+}$, $M^{3+}$ comprises $Al^{3+}$, and $A^{n-}$ comprises $OH^-$ and/or $CO_3^{2-}$. In the general formula, n is an integer of 1 or more, preferably 1 or 2; x is 0.1 to 0.4, preferably 0.2 to 0.35; and m is any real number. In the general formula, $M^{3+}$ may be partially or entirely replaced with a cation having a valency of 4 or more. In such a case, the coefficient x/n of the anion $A^{n-}$ in the general formula may be appropriately varied, and m is any real number or integer of 0 or greater, typically greater than 0 or 1 or greater, representing the number of moles of water.

The inorganic solid electrolyte is preferably densified through hydrothermal treatment (i.e., a hydrothermally synthesized product). The hydrothermal treatment is very effective for the densification of a layered double hydroxide, in particular, an Mg—Al layered double hydroxide. The densification by the hydrothermal treatment involves, for example, a process described in Patent Document 1 (WO2013/118561), in which pure water and a green compact plate treated in a pressure container at a temperature of 120 to 250° C., preferably 180 to 250° C. for 2 to 24 hours, preferably 3 to 10 hours. A more preferred process involving the hydrothermal treatment will be described below.

The inorganic solid electrolyte may be in the form of a membrane or layer densified enough to have water impermeability. The inorganic solid electrolyte in a membrane or layer form is preferably disposed on or in the porous substrate. The inorganic solid electrolyte in a membrane or layer form having a thickness smaller than that of the plate is advantageous in that the electrolyte has a minimum hardness required for preventing the penetration of dendritic zinc and significantly reduces the resistance of the separator. The inorganic solid electrolyte in a membrane or layer form has a thickness of preferably 100 μm or less, more preferably 75 μm or less, still more preferably 50 μm or less, particularly preferably 25 μm or less, most preferably 5 μm or less. Such a small thickness achieves a reduction in resistance of the separator. The lower limit of the thickness may vary depending on the intended use of the inorganic solid electrolyte. The thickness is preferably 1 μm or more, more preferably 2 μm or more in order to secure a hardness required for a separator membrane or layer.

The separator preferably includes a porous substrate on either or both of the surfaces of the separator. The porous substrate has water permeability, and thus the electrolytic solution permeates the substrate and reaches the separator. The presence of the porous substrate leads to reliable retention of hydroxide ions on the separator. The strength imparted by the porous substrate can reduce the thickness of the separator, resulting in a reduction in resistance. A dense membrane or layer of the inorganic solid electrolyte (preferably LDH) may be formed on or in the porous substrate.

The disposition of the porous substrate on one surface of the separator probably involves a process including preparation of the porous substrate and formation of a membrane of the inorganic solid electrolyte on the porous substrate (this process will be described below). In contrast, the disposition of the porous substrate on the two surfaces of the separator probably involves a process including densification of the raw powder of the inorganic solid electrolyte disposed between two porous substrates. For example, with reference to FIG. 9 described later, the porous substrate 128 is disposed entirely on one surface of the separator 120. Alternatively, the porous substrate 128 may be disposed only on a portion (e.g., a region responsible for charge/discharge reaction) of one surface of the separator 120. For example, the formation of a membrane or layer of the inorganic solid electrolyte on or in the porous substrate typically leads to the process-derived structure; i.e., the porous substrate is disposed entirely on one surface of the separator. In contrast, the formation of an independent plate of the inorganic solid electrolyte (having no substrate) may involve the subsequent step of disposing the porous substrate on a portion (e.g., a region responsible for charge/discharge reaction) or the entirety of one surface of the separator. The configuration of the porous substrate is not described in detail now but will be described later in the section of LDH separator with porous substrate.

The electrolytic solution contains an aqueous alkali metal hydroxide. Examples of the alkali metal hydroxide include potassium hydroxide, sodium hydroxide, lithium hydroxide, and ammonium hydroxide. More preferred is potassium hydroxide. In the case of the zinc secondary battery, the electrolytic solution may contain a zinc compound, such as zinc oxide or zinc hydroxide, for preventing the self-dissolution of a zinc alloy. As described above, the alkaline electrolytic solution may be in the form of a positive-electrode mixture and/or a negative-electrode mixture prepared through combination with the positive electrode and/or the negative electrode. Alternatively, the alkaline electrolytic solution may be formed into a gel for preventing the leakage of the solution. The gelling agent is preferably a polymer that swells through absorption of the solvent of the electrolytic solution. Examples of the gelling agent include polymers, such as polyethylene oxide), poly(vinyl alcohol), and polyacrylamide; and starch.

If the separator contains layered double hydroxide (LDH), the electrolytic solution preferably contains an Al-containing compound dissolved. When LDH is put into contact with an aqueous alkali metal hydroxide, such as aqueous potassium hydroxide, Al, a typical constituent element of LDH, may elute into the aqueous solution to deteriorate the dense membrane, but the Al elution and consequent deterioration of the dense membrane can be prevented by previously adding an Al-containing compound to the electrolytic solution. The Al dissolved in the electrolytic solution may be in any form, and is typically in the form of a metal ion, a hydroxide, and/or a hydroxy complex. For example, Al dissolved in the electrolytic solution may be in the form of $Al^{3+}$, $Al(OH)^{2+}$, $Al(OH)_2^+$, $Al(OH)_3^0$, $Al(OH)_4^-$, or $Al(OH)_5^{2-}$. Preferred examples of the Al-containing metal compound include aluminum hydroxide, γ-alumina, α-alumina, boehmite, diaspore, hydrotalcite, and any combination of these compounds. The Al-containing metal compound is more preferably aluminum hydroxide and/or γ-alumina, most preferably aluminum hydroxide. The Al-containing metal compound may be added such that the Al concentration of the electrolytic solution is preferably 0.001 mol/L or more, more preferably 0.01 mol/L or more, further preferably 0.1 mol/L or more, particularly preferably 1.0 mol/L or more, most preferably 2.0 mol/L or more, more than 3.0 mol/L, or 3.3 mol/L or more. The upper limit of the Al concentration of the electrolytic solution may be any value. The Al concentration may be equal to the saturation solubility of the Al compound in the electrolytic solution and is, for example, 20 mol/L or less or 10 mol/L or less.

In the battery 10 assembled as described above, the positive electrode plate 12a, 12b and 12c and the negative electrode plates 22a, 22b, and 22c are disposed between the two end face plates 30g and 30h such that the separator structures 20a, 20b, 20c, 20d, and 20e are interposed between the positive and negative electrodes. The peripheries of the separator structures 20a, 20b, 20c, 20d, and 20e are held between two adjacent frames among the frames 30a, 30b, 30c, 30d, 30e, and 30f. The positive electrode plates 12a, 12b, and 12c or the negative electrode plates 22a, 22b, and 22c are each disposed in a region defined by the frames 30a, 30b, 30c, 30d, 30e, 30f and between the separator structures 20a and 20e and the end face plates 30g and 30h and/or between two adjacent separator structures among the separator structures 20a, 20b, 20c, 20d, and 20e. The peripheries of the separator structures 20a, 20b, 20c, 20d, and 20e preferably are bonded to the frames 30a, 30b, 30c, 30d, 30e, and 30f to ensure liquid tightness.

Nickel-Zinc Battery

Figure 9:
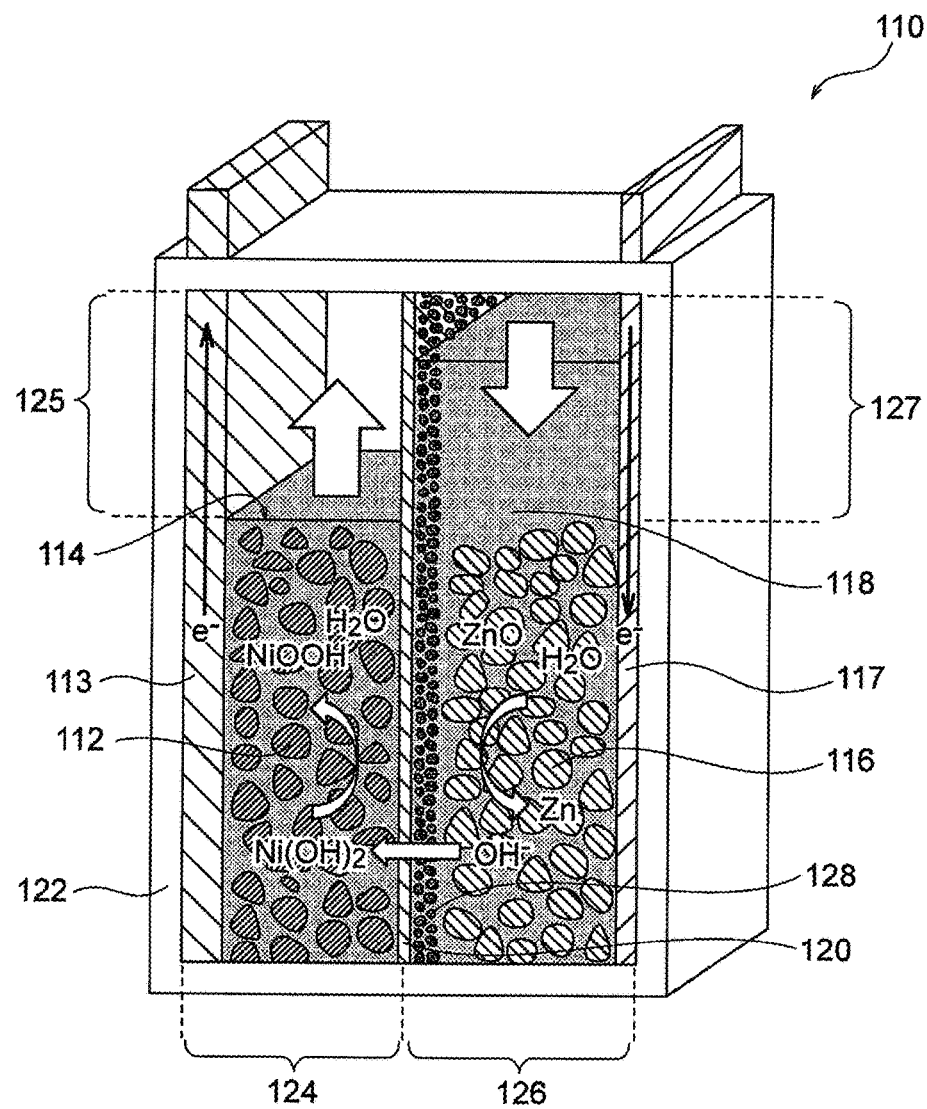
FIG. 9 is a schematic illustration of an exemplary nickel-zinc secondary battery, the battery being in a discharge end state.

According to a preferred embodiment of the invention, a nickel-zinc secondary battery is provided. Accordingly, the nickel-zinc secondary battery will now be explained. The following description is not based on a configuration of a stacked-cell battery as shown in FIG. 1, but on a simpler configuration of a unit cell including a single set of positive electrode plate, a separator, and a negative electrode plate, for better understanding of the idea of the invention. It should be understood that details of components in the following description also apply to the stacked-cell battery of the invention. FIG. 9 is a schematic illustration of an exemplary nickel-zinc battery according to the present embodiment. FIG. 9 illustrates the initial state (i.e., discharge end state) of the nickel-zinc battery before charging. It should be understood that the nickel-zinc battery according to the present embodiment may be in a full charge state. As illustrated in FIG. 9, the nickel-zinc battery 110 according to the present embodiment includes a resin container 122, and the resin container 122 includes a positive electrode 112, a positive-electrode electrolytic solution 114, a negative electrode 116, a negative-electrode electrolytic solution 118, and a ceramic separator 120. The positive electrode 112 contains nickel hydroxide and/or nickel oxyhydroxide. The positive-electrode electrolytic solution 114 is an alkaline electrolytic solution containing an alkali metal hydroxide. The positive electrode 112 is immersed in the positive-electrode electrolytic solution 114. The negative electrode 116 contains zinc and/or zinc oxide. The negative-electrode electrolytic solution 118 is an alkaline electrolytic solution containing an alkali metal hydroxide. The negative electrode 116 is immersed in the negative-electrode electrolytic solution 118. The resin container 122 accommodates the positive electrode 112, the positive-electrode electrolytic solution 114, the negative electrode 116, and the negative-electrode electrolytic solution 118. The positive electrode 112 is not necessarily separated from the positive-electrode electrolytic solution 114, and the positive electrode 112 and the positive-electrode electrolytic solution 114 may be combined into a positive-electrode mixture. Similarly, the negative electrode 116 is not necessarily separated from the negative-electrode electrolytic solution 118, and the negative electrode 116 and the negative-electrode electrolytic solution 118 may be combined into a negative-electrode mixture. A positive-electrode current collector 113 is optionally disposed in contact with the positive electrode 112, and a negative-electrode current collector 117 is optionally disposed in contact with the negative electrode 116.

The separator 120 is disposed in the resin container 122 so as to separate a positive-electrode chamber 124 accommodating the positive electrode 112 and the positive-electrode electrolytic solution 114 from a negative-electrode chamber 126 accommodating the negative electrode 116 and the negative-electrode electrolytic solution 118. The separator 120 exhibits hydroxide ion conductivity and water impermeability. The water impermeability of the separator 120 indicates that the separator 120 has a density sufficiently high to prevent the permeation of water and is not a porous film or porous material having water permeability. Thus, this configuration is very effective for physically inhibiting the penetration of dendritic zinc (which may be formed during a charge mode of the battery) through the separator, to prevent the short circuit between the positive and negative electrodes. As illustrated in FIG. 9, the separator 120 may be provided with a porous substrate 128. In any case, the hydroxide ion conductivity of the separator 120 leads to efficient migration of hydroxide ions between the positive-electrode electrolytic solution 114 and the negative-electrode electrolytic solution 118, resulting in charge/discharge reaction in the positive-electrode chamber 124 and the negative-electrode chamber 126. The following reactions occur at the positive-electrode chamber 124 and the negative-electrode chamber 126 during a charge mode of the battery (reverse reactions occur during a discharge mode).

Positive electrode: $Ni(OH)_2 + OH^- \rightarrow NiOOH + H_2O + e^-$

Negative electrode: $ZnO + H_2O + 2e^- \rightarrow Zn + 2OH^-$

The aforementioned reaction at the negative electrode involves the following two reactions:

Dissolution of ZnO: $ZnO + H_2O + 2OH^- \rightarrow Zn(OH)_4^{2-}$

Precipitation of Zn: $Zn(OH)_4^{2-} + 2e^- \rightarrow Zn + 4OH^-$

Figure 10:
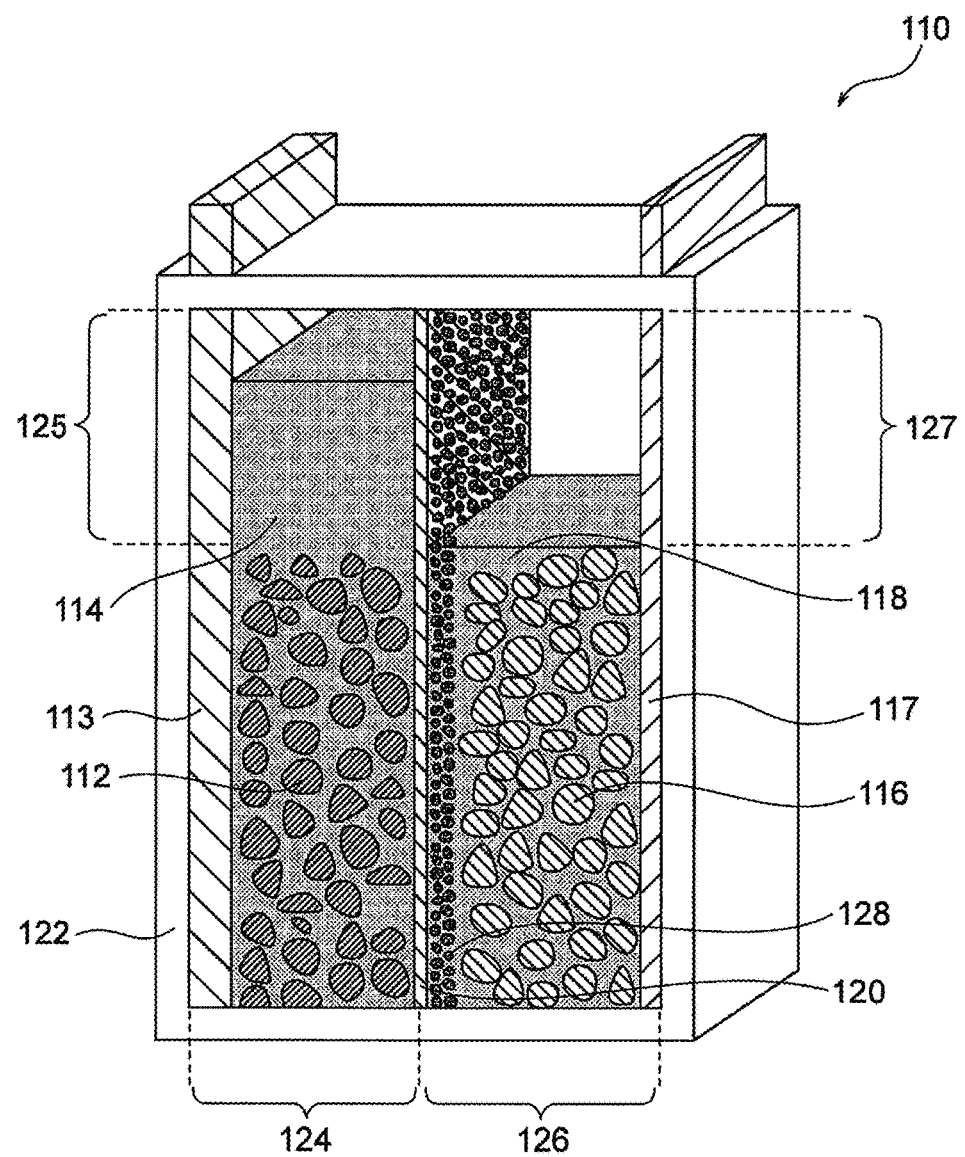
FIG. 10 illustrates the full charge state of the nickel-zinc secondary battery of FIG. 9.

The nickel-zinc battery 110 preferably has an extra positive-electrode space 125 in the positive-electrode chamber 124. The extra positive-electrode space 125 has a volume that meets a variation in amount of water in association with the reaction at the positive electrode during charge/discharge of the battery. Also, the nickel-zinc battery 110 preferably has an extra negative-electrode space 127 in the negative-electrode chamber 126. The extra negative-electrode space 127 has a volume that meets a variation in amount of water in association with the reaction at the negative electrode during charge/discharge of the battery. This configuration effectively prevents problems caused by a variation in amount of water in the positive-electrode chamber 124 and the negative-electrode chamber 126 (e.g., liquid leakage and deformation of the container due to a variation in internal pressure of the container), resulting in further improved reliability of the nickel-zinc battery. As indicated by the aforementioned reaction formulae, the amount of water increases in the positive-electrode chamber 124 and decreases in the negative-electrode chamber 126 during a charge mode, whereas the amount of water decreases in the positive-electrode chamber 124 and increases in the negative-electrode chamber 126 during a discharge mode. Most traditional separators exhibit water permeability and thus allow water to pass therethrough freely. In contrast, the separator 120 used in the present embodiment has high density and water impermeability. Hence, water cannot pass through the separator 120 freely, and an increase in amount of the electrolytic solution in the positive-electrode chamber 124 and/or the negative-electrode chamber 126 during charge/discharge of the battery may cause problems, such as liquid leakage. As illustrated in FIG. 10, the positive-electrode chamber 124 has the extra positive-electrode space 125 having a volume that meets a variation in amount of water in association with the reaction at the positive electrode during charge/discharge of the battery, and thus the extra positive-electrode space 125 can buffer an increase in amount of the positive-electrode electrolytic solution 114 during a charge mode. Since the extra positive-electrode space 125 serves as a buffer even after full charge as illustrated in FIG. 10, an increased amount of the positive-electrode electrolytic solution 114 can be reliably retained in the positive-electrode chamber 124 without causing overflow of the electrolytic solution. Similarly, the negative-electrode chamber 126 has the extra negative-electrode space 127 having a volume that meets a variation in amount of water in association with the reaction at the negative electrode during charge/discharge of the battery, and thus the extra negative-electrode space 127 can buffer an increase in amount of the negative-electrode electrolytic solution 118 during a discharge mode.

A variation in amount of water in the positive-electrode chamber 124 or the negative-electrode chamber 126 can be determined on the basis of the aforementioned reaction formulae. As indicated by the reaction formulae, the amount of $H_2O$ produced at the positive electrode 112 during a charge mode is twice the amount of $H_2O$ consumed at the negative electrode 116. Thus, the volume of the extra positive-electrode space 125 may be greater than that of the extra negative-electrode space 127. The volume of the extra positive-electrode space 125 is preferably determined such that the positive-electrode chamber 124 can be adapted to an increased amount of water and gasses (e.g., air originally contained in the positive-electrode chamber 124, and oxygen gas generated from the positive electrode 112 during overcharge) at an appropriate internal pressure. Although the volume of the extra negative-electrode space 127 may be equal to that of the extra positive-electrode space 125 as illustrated in FIG. 9, the volume of the extra negative-electrode space 127 is preferably greater than the amount of water decreased during a charge mode in the case of the battery in a discharge end state. In any case, the volume of the extra negative-electrode space 127 may be smaller than that of the extra positive-electrode space 125 because a variation in amount of water in the negative-electrode chamber 126 is about half that in the positive-electrode chamber 124.

The nickel-zinc battery 110 in a discharge end state preferably satisfies the following conditions: the extra positive-electrode space 125 has a volume greater than the amount of water that will increase in association with the reaction at the positive electrode during a charge mode; the extra positive-electrode space 125 is not preliminarily filled with the positive-electrode electrolytic solution 114; the extra negative-electrode space 127 has a volume greater than the amount of water that will decrease in association with the reaction at the negative electrode during the charge mode; and the extra negative-electrode space 127 is preliminarily filled with an amount of the negative-electrode electrolytic solution 118 that will decrease during the charge mode. In contrast, the nickel-zinc battery 110 in a full charge state preferably satisfies the following conditions: the extra positive-electrode space 125 has a volume greater than the amount of water that will decrease in association with the reaction at the positive electrode during a discharge mode; the extra positive-electrode space 125 is preliminarily filled with an amount of the positive-electrode electrolytic solution 114 that will decrease during the discharge mode; the extra negative-electrode space 127 has a volume greater than the amount of water that will increase in association with the reaction at the negative electrode during the discharge mode; and the extra negative-electrode space 127 is not preliminarily filled with the negative-electrode electrolytic solution 118.

Preferably, the extra positive-electrode space 125 is not filled with the positive electrode 112 and/or the extra negative-electrode space 127 is not filled with the negative electrode 116. More preferably, the extra positive-electrode space 125 and the extra negative-electrode space 127 are not filled with the positive electrode 112 and the negative electrode 116, respectively. The electrolytic solution may be depleted due to a decrease in amount of water during charge/discharge of the battery in these extra spaces. Thus, the positive electrode 112 and the negative electrode 116 in these extra spaces are insufficiently involved in the charge/discharge reaction, resulting in low efficiency. If the extra positive-electrode space 125 and the extra negative-electrode space 127 are not filled with the positive electrode 112 and the negative electrode 116, respectively, the positive electrode 112 and the negative electrode 116 are effectively and reliably involved in the battery reaction.

The separator 120 exhibits hydroxide ion conductivity and water impermeability, and is typically in a plate, membrane, or layer form. The separator 120 is disposed in the hermetic container 122 so as to separate the positive-electrode chamber 124 accommodating the positive electrode 112 and the positive-electrode electrolytic solution 114 from the negative-electrode chamber 126 accommodating the negative electrode 116 and the negative-electrode electrolytic solution 118. As described above, a second separator (resin separator) composed of a hygroscopic resin or a liquid-retainable resin (e.g., non-woven fabric) may be disposed between the positive electrode 112 and the separator 120 and/or between the negative electrode 116 and the separator 120 such that the electrolytic solution can be retained in a reaction portion of the positive electrode and/or the negative electrode despite a reduction in amount of the electrolytic solution. Preferred examples of the hygroscopic resin or the liquid-retainable resin include polyolefin resins.

The positive electrode 112 contains nickel hydroxide and/or nickel oxyhydroxide. The nickel-zinc battery in a discharge end state illustrated in FIG. 9 may involve the use of nickel hydroxide in the positive electrode 112. The nickel-zinc battery in a full charge state illustrated in FIG. 10 may involve the use of nickel oxyhydroxide in the positive electrode 112. Nickel hydroxide or nickel oxyhydroxide is a common positive-electrode active material used in nickel-zinc batteries and is typically in a particulate form. Nickel hydroxide or nickel oxyhydroxide may form a solid solution in the crystal lattice with an element other than nickel for an improvement in charge efficiency at high temperature. Examples of the element include zinc and cobalt. Nickel hydroxide or nickel oxyhydroxide may be mixed with a cobalt component. Examples of the cobalt component include particulate metallic cobalt and particulate cobalt oxide (e.g., cobalt monoxide). Particulate nickel hydroxide or nickel oxyhydroxide (which may form a solid solution with an element other than nickel) may be coated with a cobalt compound. Examples of the cobalt compound include cobalt monoxide, α-cobalt (II) hydroxide, β-cobalt (II) hydroxide, cobalt compounds having a valency of more than 2, and any combination thereof.

The positive electrode 112 may contain an additional element besides the nickel hydroxide compound and the element that may form a solid solution with the compound. Examples of the additional element include scandium (Sc), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), lutetium (Lu), hafnium (Hf), tantalum (Ta), tungsten (W), rhenium (Re), osmium (Os), iridium (Ir), platinum (Pt), gold (Au), mercury (Hg), and any combination thereof. Such an additional element may be contained in any form, such as elemental metal or a metal compound (e.g., oxide, hydroxide, halide, or carbonate). The amount of the additional element (in the form of elemental metal or metal compound) is preferably 0.5 to 20 parts by weight, more preferably 2 to 5 parts by weight, relative to 100 parts by weight of the nickel hydroxide compound.

The positive electrode 112 may be combined with the electrolytic solution to form a positive-electrode mixture. The positive-electrode mixture may contain the particulate nickel hydroxide compound, the electrolytic solution, and optionally an electrically conductive material (e.g., particulate carbon) or a binder.

The positive-electrode current collector 113 is preferably disposed in contact with the positive electrode 112. As illustrated in FIG. 9, the positive-electrode current collector 113 may extend to the outside of the resin container 122 to serve as a positive-electrode terminal. Alternatively, the positive-electrode current collector 113 may be connected to a separately provided positive-electrode terminal inside or outside of the resin container 122. Preferred examples of the positive-electrode current collector 113 include nickel porous substrates, such as foamed nickel plates. In such a case, a paste containing an electrode active material (e.g., nickel hydroxide) may be evenly applied onto a nickel porous substrate and then dried, to prepare a positive electrode plate composed of the positive electrode 112 on the positive-electrode current collector 113. After the drying step, the positive electrode plate (i.e., the positive electrode 112 on the positive-electrode current collector 113) is preferably subjected to pressing for prevention of detachment of the electrode active material or an improvement in electrode density.

The negative electrode 116 contains zinc and/or zinc oxide. Zinc may be contained in any form exhibiting electrochemical activity suitable for the negative electrode; for example, in the form of metallic zinc, a zinc compound, or a zinc alloy. Preferred examples of the negative electrode material include zinc oxide, metallic zinc, and calcium zincate. More preferred is a mixture of metallic zinc and zinc oxide. The negative electrode 116 may be in the form of gel, or may be combined with the electrolytic solution to form a negative-electrode mixture. For example, the negative electrode in the form of gel may be readily prepared through addition of the electrolytic solution and a thickener to the negative-electrode active material. Examples of the thickener include poly(vinyl alcohol), poly(acrylic acid) salts, CMC, and alginic acid. Preferred is poly(acrylic acid), which exhibits high resistance to a strong alkali.

The zinc alloy may be a non-amalgamated zinc alloy; i.e., a zinc alloy not containing mercury or lead. For example, a zinc alloy containing 0.01 to 0.06 mass % indium, 0.005 to 0.02 mass % bismuth, and 0.0035 to 0.015 mass % aluminum is preferred because of the effect of reducing the generation of hydrogen gas. In particular, indium and bismuth are advantageous in improving discharge performance. The use of a zinc alloy in the negative electrode retards the self-dissolution in the alkaline electrolytic solution, to reduce the generation of hydrogen gas, resulting in improved safety.

The negative electrode material may be in any form, but is preferably in a powdery form. The powdery negative electrode material has a large surface area and is adapted to large current discharge. The negative electrode material (in the case of a zinc alloy) preferably has a mean particle size of 90 to 210 µm. The negative electrode material having such a mean particle size has a large surface area and thus is adapted to large current discharge. In addition, the negative electrode material can be evenly mixed with the electrolytic solution or a gelling agent, and is readily handled during the assembly of the battery.

The negative-electrode current collector 117 is preferably disposed in contact with the negative electrode 116. As illustrated in FIG. 9, the negative-electrode current collector 117 may extend to the outside of the resin container 122 to serve as a negative-electrode terminal. Alternatively, the negative-electrode current collector 117 may be connected to a separately provided negative-electrode terminal inside or outside of the resin container 122. Preferred examples of the negative-electrode current collector 117 include punched copper sheets. In such a case, a mixture containing zinc oxide powder and/or zinc powder and an optional binder (e.g., particulate polytetrafluoroethylene) may be applied onto a punched copper sheet to prepare a negative electrode plate composed of the negative electrode 116 on the negative-electrode current collector 117. After the drying of the mixture, the negative electrode plate (i.e., the negative electrode 116 on the negative-electrode current collector 117) is preferably subjected to pressing for prevention of detachment of the electrode active material or an improvement in electrode density.

LDH Separator with Porous Substrate

Figure 11:
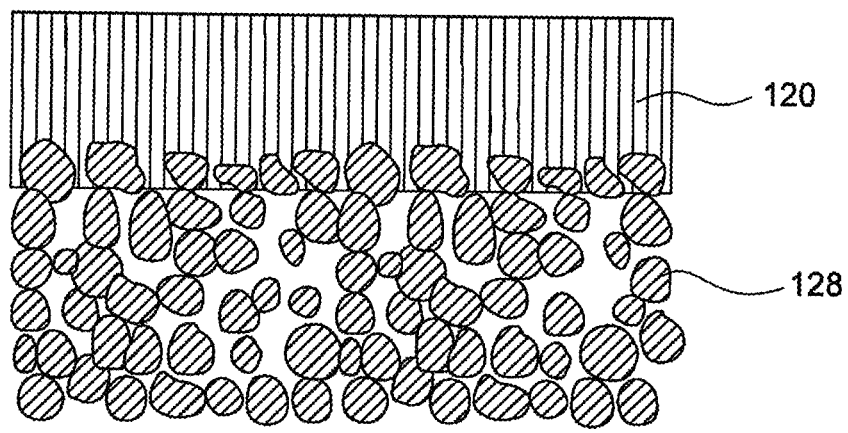
FIG. 11 is a schematic cross-sectional view of a separator provided with a porous substrate in an embodiment.
Figure 12:
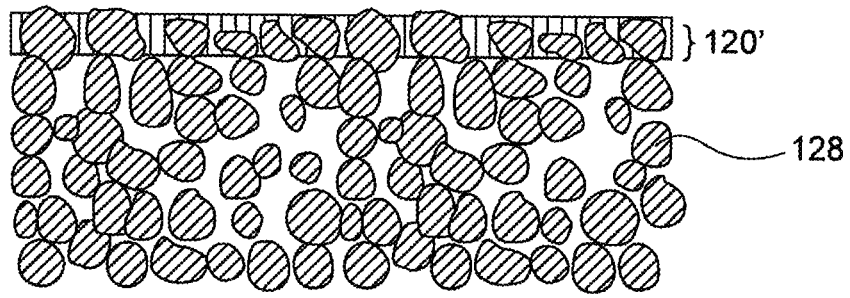
FIG. 12 is a schematic cross-sectional view of a separator provided with a porous substrate in another embodiment.

As described above, the separator provided with the porous substrate that is preferably used for the secondary battery of the present invention includes a separator composed of a hydroxide-ion-conductive inorganic solid electrolyte, and a porous substrate disposed on at least one surface of the separator. The inorganic solid electrolyte is in the form of a membrane or layer densified enough to have water impermeability. The particularly preferred separator provided with the porous substrate includes a porous substrate and a separator layer formed on and/or in the porous substrate. The separator layer contains the aforementioned layered double hydroxide (LDH). The separator layer preferably exhibits water impermeability and gas impermeability. The porous substrate exhibits water permeability and gas permeability because of the presence of pores, while the separator layer composed of LDH is preferably densified to exhibit water impermeability and gas impermeability. The separator layer is preferably formed on the porous substrate. As illustrated in FIG. 11, it is preferred that the separator layer 120 in the form of an LDH dense membrane be formed on the porous substrate 128. In view of the characteristics of the porous substrate 128, LDH particles may be formed in pores in the surface and its vicinity as illustrated in FIG. 11. Alternatively, as illustrated in FIG. 12, LDH may be densely formed in the porous substrate 128 (e.g., in pores in the surface and its vicinity of the porous substrate 128) such that at least a portion of the porous substrate 128 forms the separator layer 120'. The separator illustrated in FIG. 12 has a structure prepared by removal of a portion corresponding to the membrane of the separator layer 120 of the separator illustrated in FIG. 11. The separator may have any other structure such that the separator layer is disposed parallel to the surface of the porous substrate 128. In any case, the separator layer composed of LDH is highly-densified and thus exhibits water impermeability and gas impermeability. Thus, the separator layer exhibits particular characteristics, i.e. hydroxide ion conductivity, water impermeability and gas impermeability (i.e., the layer basically allows only hydroxide ions to pass therethrough).

The porous substrate is preferably one on which and/or in which the LDH-containing separator layer can be formed. The porous substrate may be composed of any material and may have any porous structure. In a typical embodiment, the LDH-containing separator layer is formed on and/or in the porous substrate. Alternatively, the LDH-containing separator layer may be formed on a non-porous substrate, and then the non-porous substrate may be modified into a porous form by any known process. The porous substrate preferably has a water-permeable porous structure because such a porous structure enables an electrolytic solution to come into contact with the separator layer in the case of the use of the layer as a separator for a battery.

The porous substrate is preferably composed of at least one selected from the group consisting of ceramic materials, metal materials, and polymer materials. The porous substrate is more preferably composed of a ceramic material. Preferred examples of the ceramic material include alumina, zirconia, titania, magnesia, spinel, calcia, cordierite, zeolite, mullite, ferrite, zinc oxide, silicon carbide, and any combination thereof. More preferred are alumina, zirconia, titania, and any combination thereof. Particularly preferred are alumina and zirconia. Most preferred is alumina. The use of such a porous ceramic material facilitates the formation of a highly-densified LDH-containing separator layer. Preferred examples of the metal material include aluminum and zinc. Preferred examples of the polymer material include polystyrene, polyether sulfone, polypropylene, epoxy resins, polyphenylene sulfide, hydrophilized fluororesins (e.g., poly (tetrafluoroethylene) (PTFE)), and any combination thereof. More preferably, a material having alkali resistance (i.e., resistance to an electrolytic solution of a battery) is appropriately selected from among the preferred materials described above.

The porous substrate has an average pore size of preferably 0.001 to 1.5 µm, more preferably 0.001 to 1.25 µm, still more preferably 0.001 to 1.0 µm, particularly preferably 0.001 to 0.75 µm, most preferably 0.001 to 0.5 µm. These ranges make it possible to form a dense LDH-containing separator exhibiting water impermeability while ensuring desired water permeability in the porous substrate. In the present invention, the average pore size can be determined by measuring the largest length of each pore in an electron microscopic (SEM) image of the surface of the porous substrate. The magnification of the electron microscopic (SEM) image used in this measurement is 20,000 or more. All the measured pore sizes are listed in order of size to calculate the average, from which the subsequent 15 larger sizes and the subsequent 15 smaller sizes, i.e., 30 diameters in total, are selected in one field of view. The selected sizes of two fields of view are then averaged to yield the average pore size. The pore sizes can be measured by, for example, a length-measuring function of a SEM or image analysis software (e.g., Photoshop manufactured by Adobe).

The surface of the porous substrate has a porosity of preferably 10 to 60%, more preferably 15 to 55%, still more preferably 20 to 50%. These ranges make it possible to form a dense LDH-containing separator layer that exhibits water impermeability, while ensuring desired water permeability of the porous substrate. The surface porosity of the porous substrate is used in the present invention because it can be readily measured by image processing described below and substantially reflects the internal porosity of the porous substrate. Thus, if the surface of the porous substrate is dense, the inside of the porous substrate is also dense. In the present invention, the porosity at the surface of the porous substrate can be measured by a method involving image processing as follows: 1) an electron microscopic (SEM) image of the surface of the porous substrate is taken at a magnification of 10,000 or more; 2) the grayscale SEM image is read with an image analysis software, such as Photoshop (manufactured by Adobe); 3) a monochromatic binary image is prepared by using tools named [image], [color compensation], and [binarization] in this order; and 4) the porosity (%) is calculated by dividing the number of pixels of the black area(s) by the number of all the pixels of the image. Preferably, the porosity is measured over a 6 μm×6 μm area of the surface of the porous substrate by image processing. More preferably, the porosities in three 6 μm×6 μm areas selected at random are averaged for objective evaluation.

The separator layer is formed on and/or in the porous substrate, preferably on the porous substrate. For example, the separator layer 120 formed on the porous substrate 128 as illustrated in FIG. 11 is in the form of an LDH dense membrane, and the LDH dense membrane is typically composed of LDH. The separator layer 120' formed in the porous substrate 128 as illustrated in FIG. 12 is typically composed of at least a portion of the porous substrate 128 and LDH because LDH is densely formed in the porous substrate 128 (typically in pores in the surface and its vicinity of the porous substrate 128). The separator layer 120' illustrated in FIG. 12 is prepared through removal of a membrane portion of the separator layer 120 illustrated in FIG. 11 by any known technique, such as polishing or machining.

The separator layer preferably exhibits water impermeability and gas impermeability. For example, if water is brought into contact with one surface of the separator layer at 25° C. for one week, water does not permeate the separator layer, and if helium gas is fed to one surface of the separator layer under application of a differential pressure of 0.5 atm, helium gas does not permeate the separator layer. Preferably, the separator layer composed of LDH is densified to exhibit water impermeability and gas impermeability. If the dense membrane has local and/or incidental defects exhibiting water permeability, the defects may be filled with an appropriate repairing agent (e.g., an epoxy resin) for ensuring water impermeability and gas impermeability. Such a repairing agent does not necessarily exhibit hydroxide ion conductivity. The surface of the separator layer (typically LDH dense membrane) has a porosity of preferably 20% or less, more preferably 15% or less, still more preferably 10% or less, particularly preferably 7% or less. A lower porosity of the surface of the separator layer indicates a higher density of the separator layer (typically LDH dense membrane). Such a high density is preferred. The surface porosity of the separator layer is used in the present invention because it can be readily measured by image processing described below and substantially reflects the internal porosity of the separator layer. Thus, if the surface of the separator layer is dense, the inside of the separator layer is also dense. In the present invention, the porosity of the surface of the separator layer can be measured by a method involving image processing as follows: 1) an electron microscopic (SEM) image of the surface of the separator layer is taken at a magnification of 10,000 or more; 2) the grayscale SEM image is read with image analysis software, such as Photoshop (manufactured by Adobe); 3) a monochromatic binary image is prepared by using tools named [image], [color compensation], and [binarization] in this order; and 4) the porosity (%) is calculated by dividing the number of pixels of the black area(s) by the number of all the pixels of the image. Preferably, the porosity is measured over a 6 μm×6 μm area of the surface of the separator layer by image processing. More preferably, the porosities in three 6 μm×6 μm areas selected at random are averaged for objective evaluation.

Preferably, the layered double hydroxide is composed of an aggregation of platy particles (i.e., platy LDH particles), and these platy particles are oriented such that the tabular faces of the platy particles are substantially perpendicular to or oblique to the surface of the porous substrate (i.e., the substrate surface). In particular, this preferred embodiment is applied to the case where the separator layer 120 is disposed in the form of an LDH dense membrane on the porous substrate 128 as illustrated in FIG. 11. Alternatively, this embodiment may be applied to the case where LDH is densely formed in the porous substrate 128 (typically in pores in the surface and its vicinity of the porous substrate 128), and at least a portion of the porous substrate 128 constitutes the separator layer 120' as illustrated in FIG. 12.

Figure 13:
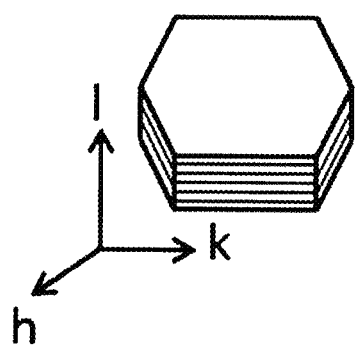
FIG. 13 is a schematic illustration of a platy particle of layered double hydroxide (LDH).

As illustrated in FIG. 13, the LDH crystal is in the form of a platy particle with a layered structure. The substantially perpendicular or oblique orientation described above is significantly beneficial for the LDH-containing separator layer (e.g., LDH dense membrane), because an oriented LDH-containing separator layer (e.g., an oriented LDH dense membrane) exhibits anisotropic hydroxide ion conductivity, i.e., hydroxide ion conductivity along the orientation of the platy LDH particles (i.e., parallel to layers of LDH) is much greater than that perpendicular to the orientation of the platy LDH particles in the oriented LDH membrane. In fact, the applicant has revealed that the hydroxide ion conductivity (S/cm) along the orientation of LDH particles in an oriented LDH bulk body is an order of magnitude greater than the hydroxide ion conductivity (S/cm) perpendicular to the orientation of LDH particles. Thus, the substantially perpendicular or oblique orientation in the LDH-containing separator layer according to the present embodiment fully or significantly leads to the anisotropic hydroxide ion conductivity of the oriented LDH to the thickness direction of the layer (i.e., the direction perpendicular to the surface of the separator layer or the surface of the porous substrate), whereby the conductivity in the thickness direction can be maximally or significantly increased. In addition, the LDH-containing separator layer has a layered structure and thus exhibits lower resistance than an LDH bulk block. The LDH-containing separator layer having such an orientation readily conducts hydroxide ions in the thickness direction of the layer. Because of its high density, the LDH-containing separator layer is very suitable for use as a separator that requires high conductivity across the thickness of the layer and high density.

In a particularly preferred embodiment, the LDH-containing separator layer (typically LDH dense membrane) is composed of the platy LDH particles highly oriented in the substantially perpendicular direction. If the platy LDH particles are highly orientated in the substantially perpendicular direction, the X-ray diffractometry of the surface of the separator layer shows substantially no peak of (003) plane or a peak of (003) plane smaller than that of (012) plane (note: this shall not apply to the case where the porous substrate shows a peak at the same angle as the peak of (012) plane of the platy LDH particles, because the peak of (012) plane of the platy LDH particles cannot be specified). This characteristic peak profile indicates that the platy LDH particles of the separator layer are oriented substantially perpendicular to (i.e, perpendicular to or nearly perpendicular to, and preferably perpendicular to) the separator layer. The peak of (003) plane is strongest among peaks observed by X-ray diffractometry of non-oriented LDH powder. In contrast, the oriented LDH-containing separator layer shows substantially no peak of (003) plane or the peak of (003) plane smaller than the peak of (012) plane because platy LDH particles are oriented substantially perpendicular to the separator layer. The reason for this is as follows: The c planes (001) including the (003) plane (where I is 3 or 6) are parallel to the layers of platy LDH particles. If the platy LDH particles are oriented substantially perpendicular to the separator layer, the layers of platy LDH particles are also substantially perpendicular to the separator layer and thus the X-ray diffractometry of the surface of the separator layer shows no peak or very small peak of (001) plane (where I is 3 or 6). The peak of (003) plane, if present, tends to be stronger than the peak of (006) plane, and the use of the peak of (003) plane facilitates determination of the substantially perpendicular orientation as compared with the use of the peak of (006) plane. Thus, the oriented LDH-containing separator layer preferably shows substantially no peak of (003) plane or shows the peak of (003) plane smaller than the peak of (012) plane, which indicates that the highly perpendicular orientation is achieved.

The separator layer has a thickness of preferably 100 μm or less, more preferably 75 μm or less, still more preferably 50 μm or less, particularly preferably 25 μm or less, most preferably 5 μm or less. Such a small thickness leads to a reduction in resistance of the separator. The separator layer is preferably formed as an LDH dense membrane on the porous substrate. In this case, the thickness of the separator layer corresponds to the thickness of the LDH dense membrane. If the separator layer is formed in the porous substrate, the thickness of the separator layer corresponds to the thickness of a composite layer composed of LDH and at least a portion of the porous substrate. If the separator layer is formed on and in the porous substrate, the thickness of the separator layer corresponds to the total thickness of the LDH dense membrane and the composite layer. The separator layer having the above thickness exhibits a low resistance suitable for use in, for example, a battery. The lower limit of the thickness of the oriented LDH membrane, which may vary with the intended use of the membrane, may be any value. In order to ensure the hardness desirable for use in a functional membrane, such as a separator, the thickness is preferably 1 μm or more, more preferably 2 μm or more.

The LDH separator provided with the porous substrate can be produced through a method involving (1) providing a porous substrate, (2) immersing the porous substrate in an aqueous stock solution containing magnesium ions ($Mg^{2+}$) and aluminum ions ($Al^{3+}$) in a total concentration of 0.20 to 0.40 mol/L and further containing urea, and (3) hydrothermally treating the porous substrate in the aqueous stock solution, to form a separator layer containing a layered double hydroxide on and/or in the porous substrate.

(1) Provision of Porous Substrate

As described above, the porous substrate is preferably composed of at least one selected from the group consisting of ceramic materials, metal materials, and polymer materials. The porous substrate is more preferably composed of a ceramic material. Preferred examples of the ceramic material include alumina, zirconia, titania, magnesia, spinel, calcia, cordierite, zeolite, mullite, ferrite, zinc oxide, silicon carbide, and any combination thereof. More preferred are alumina, zirconia, titania, and any combination thereof. Particularly preferred are alumina and zirconia. Most preferred is alumina. The use of such a porous ceramic material facilitates the formation of a highly-densified LDH-containing separator layer. In the case of a ceramic porous substrate, the porous substrate is preferably subjected to, for example, ultrasonic cleaning or cleaning with ion-exchange water.

(2) Immersion in Aqueous Stock Solution

The porous substrate is then immersed in the aqueous stock solution in a desired direction (e.g., horizontally or perpendicularly). For horizontal retention of the porous substrate, the porous substrate may be hanged up in or suspended in a container of the aqueous stock solution, or placed on the bottom of the container. For example, the porous substrate may be immobilized and suspended in the stock solution and away from the bottom of the container. For perpendicular retention of the porous substrate, a jig may be disposed that can hold the porous substrate perpendicularly to the bottom of the container. In any case, a preferred configuration or arrangement is one that can achieve growth of LDH substantially perpendicular to the porous substrate (i.e., growth of LDH such that the tabular faces of platy LDH particles are substantially perpendicular to or oblique to the surface of the porous substrate). The aqueous stock solution contains magnesium ions ($Mg^{2+}$) and aluminum ions ($Al^{3+}$) in a specific total concentration and further contains urea. Urea is hydrolyzed into ammonia and raises the pH of the aqueous stock solution, and metal ions co-existing in the aqueous stock solution form hydroxides, to produce LDH. The hydrolysis of urea, which also generates carbon dioxide, can form LDH having carbonate ions as anions. The aqueous stock solution contains magnesium ions ($Mg^{2+}$) and aluminum ions ($Al^{3+}$) in a total concentration of preferably 0.20 to 0.40 mol/L, more preferably 0.22 to 0.38 mol/L, still more preferably 0.24 to 0.36 mol/L, particularly preferably 0.26 to 0.34 mol/L. Such a preferred concentration range facilitates the nucleation and the crystal growth in a well-balanced manner and can form a highly-oriented, highly-densified LDH membrane. At a low total concentration of magnesium ions and aluminum ions, the crystal growth presumably dominates over the nucleation, resulting in a decrease in the number of LDH particles and an increase in size of the LDH particles. At a high total concentration, the nucleation presumably dominates over the crystal growth, resulting in an increase in the number of LDH particles and a decrease in size of the LDH particles.

Preferably, the aqueous stock solution contains dissolved magnesium nitrate and aluminum nitrate; i.e., the aqueous stock solution contains nitrate ions besides magnesium ions and aluminum ions. In this case, the molar ratio of the urea to the nitrate ions ($NO_3^-$) (i.e., urea/$NO_3^-$) in the aqueous stock solution is preferably 2 to 6, more preferably 4 to 5.

(3) Formation of LDH-Containing Separator Layer through Hydrothermal Treatment

The porous substrate is hydrothermally treated in the aqueous stock solution to form the LDH-containing separator layer on and/or in the porous substrate. The hydrothermal treatment is performed in a hermetic container at a temperature of preferably 60 to 150° C., more preferably 65 to 120° C., still more preferably 65 to 100° C., particularly preferably 70 to 90° C. The hydrothermal treatment temperature may have any upper limit without causing thermal deformation of the porous substrate (e.g., a polymer substrate). The temperature can be elevated at any rate in the hydrothermal treatment. The temperature elevation rate may be 10 to 200° C./h, and preferably 100 to 200° C./h, more preferably 100 to 150° C./h. The time for the hydrothermal treatment may be determined depending on the target density or thickness of the LDH membrane.

After the hydrothermal treatment, the porous substrate is removed from the hermetic container, and then preferably cleaned with ion-exchange water.

The LDH-containing separator layer in the LDH-containing composite material produced as described above is composed of densely assembled platy LDH particles that are oriented in the substantially perpendicular direction, which is beneficial for the conductivity. Thus, the LDH-containing separator layer is very suitable for use in a nickel-zinc secondary battery that has suffered from growth of dendritic zinc which is an obstacle to practical use of this battery.

The above-described method may form LDH-containing separator layers on the two surfaces of the porous substrate. Thus, in order to modify the LDH-containing composite material into a form suitable for use as a separator, the LDH-containing separator layer on one surface of the porous substrate is preferably removed through mechanical scraping after the formation of the separator layers. Alternatively, it is desirable to take a measure to prevent formation of the LDH-containing separator layer on one surface of the porous substrate in advance.

EXAMPLES

The present invention will now be described in more detail by way of Examples.

Example 1: Preparation and Evaluation of LDH Separator with Porous Substrate (1) Preparation of Porous Substrate Boehmite (DISPAL 18N4-80, manufactured by Sasol Limited), methyl cellulose, and ion-exchange water were weighed in proportions by mass of 10:1:5, and were then kneaded together. The kneaded product was subjected to extrusion molding with a hand press into a plate having a size sufficiently exceeding 5 cm×8 cm and a thickness of 0.5 cm. The resultant green body was dried at 80° C. for 12 hours and then fired at 1,150° C. for three hours, to prepare an alumina porous substrate. The porous substrate was cut into a piece of 5 cm×8 cm.

Figure 14:
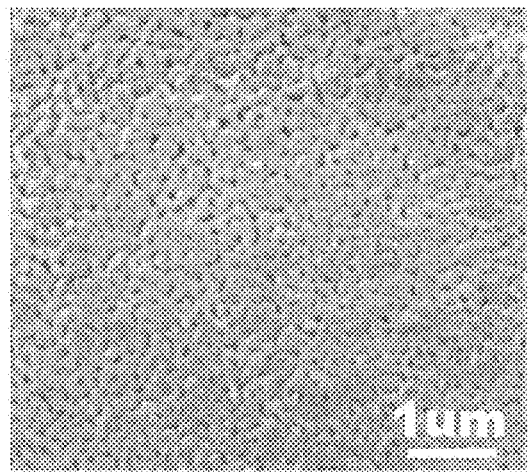
FIG. 14 is a SEM image of the surface of a porous alumina substrate prepared in Example 1.

The porosity at the surface of the resultant porous substrate was determined by a method involving image processing. The porosity was 24.6%. The porosity was determined as follows: 1) a scanning electron microscopic (SEM) image of the surface microstructure of the porous substrate was taken with a scanning electron microscope (SEM; JSM-6610LV, manufactured by JEOL Ltd.) (magnification: 10,000 or more) at an acceleration voltage of 10 to 20 kV; 2) the grayscale SEM image was read with image analysis software, such as Photoshop (manufactured by Adobe); 3) a monochromatic binary image was prepared by using tools named [image], [color compensation], and [binarization] in this order; and 4) the porosity (%) was determined by dividing the number of pixels of the black areas by the number of all the pixels of the image. The porosity was determined over a 6 μm×6 μm area of the surface of the porous substrate. FIG. 14 illustrates the SEM image of the surface of the porous substrate.

The average pore size of the porous substrate was about 0.1 μm. In the present invention, the average pore size was determined by measuring the largest length of each pore in a scanning electron microscopic (SEM) image of the surface of the porous substrate. The magnification of the scanning electron microscopic (SEM) image used in this measurement was 20,000. All the measured pore sizes were listed in order of size to calculate the average, from which the subsequent 15 larger sizes and the subsequent 15 smaller sizes, i.e., 30 sizes in total, were selected in one field of view. The selected sizes of two fields of view are then averaged to yield the average pore size. The pore sizes were measured by, for example, a length-measuring function of SEM software.

(2) Cleaning of Porous Substrate

The resultant porous substrate was ultrasonically cleaned in acetone for five minutes, in ethanol for two minutes, and then in ion-exchange water for one minute.

(3) Preparation of Aqueous Stock Solution

Magnesium nitrate hexahydrate ($Mg(NO_3)_2 \cdot 6H_2O$, manufactured by KANTO CHEMICAL Co., Inc.), aluminum nitrate nonahydrate ($Al(NO_3)_3 \cdot 9H_2O$, manufactured by KANTO CHEMICAL Co., Inc.), and urea (($NH_2$)$_2$CO, manufactured by Sigma-Aldrich Corporation) were provided as raw materials for an aqueous stock solution. Magnesium nitrate hexahydrate and aluminum nitrate nonahydrate were weighed and placed in a beaker, and then ion-exchange water was added to the beaker to achieve a total volume of 600 mL, a ratio of the cations ($Mg^{2+}/Al^{3+}$) of 2, and a molar concentration of the total metal ions (i.e., $Mg^{2+}$ and $Al^{3+}$) of 0.320 mol/L. The resultant solution was agitated and urea was then added to the solution. The added urea was weighed in advance to give a urea/$NO_3^-$ ratio of 4. The resultant solution was further agitated to prepare an aqueous stock solution.

(4) Formation of Membrane by Hydrothermal Treatment

The aqueous stock solution prepared in the above procedure (3) and the porous substrate cleaned in the above procedure (2) were enclosed together in a hermetic Teflon container (with an internal volume of 800 mL and a stainless steel jacket). The porous substrate was horizontally suspended and away from the bottom of the hermetic Teflon container such that the opposite surfaces of the porous substrate came into contact with the aqueous stock solution. Thereafter, the porous substrate was subjected to hydrothermal treatment at a hydrothermal temperature of 70° C. for 168 hours (7 days), to form oriented layered double hydroxide membranes (separator layers) on the surfaces of the substrate. After the elapse of a predetermined period of time, the porous substrate was removed from the hermetic container, cleaned with ion-exchange water, and then dried at 70° C. for 10 hours, to form a dense membrane of the layered double hydroxide (LDH) on the porous substrate (hereinafter the dense membrane will be referred to as "membrane sample"). The thickness of the membrane sample was about 1.5 μm. A Layered double hydroxide-containing composite material sample (hereinafter referred to as "composite material sample") was thereby prepared. LDH membranes were formed on the opposite surfaces of the porous substrate. In order to use the composite material as a separator, the LDH membrane on one surface of the porous substrate was mechanically removed.

(5) Evaluations (5a) Identification of Membrane Sample

Figure 15:
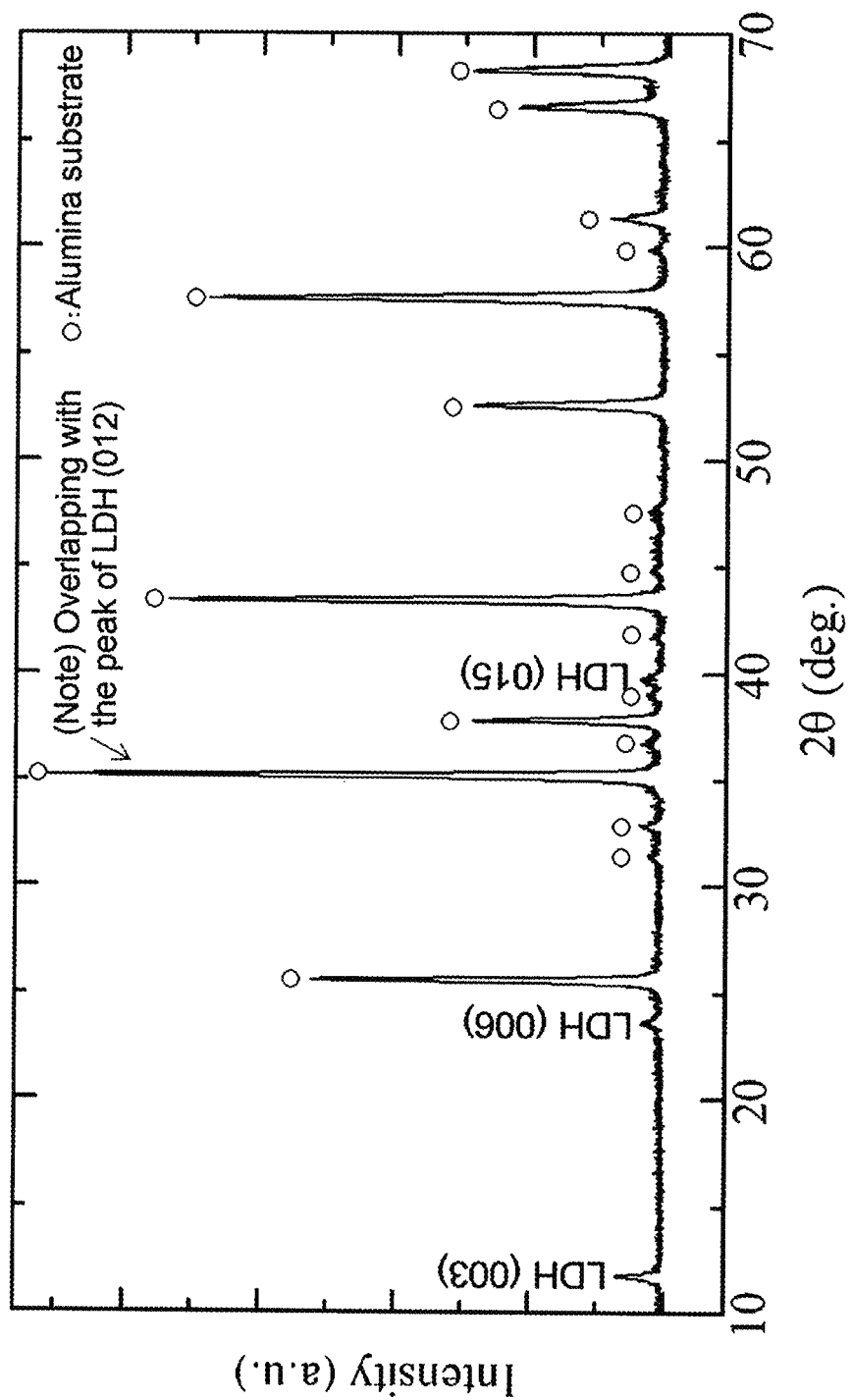
FIG. 15 is an XRD profile of a crystalline phase of a sample in Example 1.

A crystalline phase of a membrane sample was analyzed with an X-ray diffractometer (RINT-TTR III, manufactured by Rigaku Corporation) at a voltage of 50 kV, a current of 300 mA, and a measuring range of 10° to 70°. The resultant XRD profile is illustrated in FIG. 15. The XRD profile was compared with the diffraction peaks of a layered double hydroxide (or a hydrotalcite compound) described in JCPDS card No. 35-0964 for identification of the membrane sample. The membrane sample was identified as a layered double hydroxide (LDH, or a hydrotalcite compound). As shown in the XRD profile of FIG. 15, peaks derived from alumina in the porous substrate on which the membrane sample was formed (i.e., the peaks marked with a circle) were also observed.

(5b) Observation of Microstructure

Figure 16:
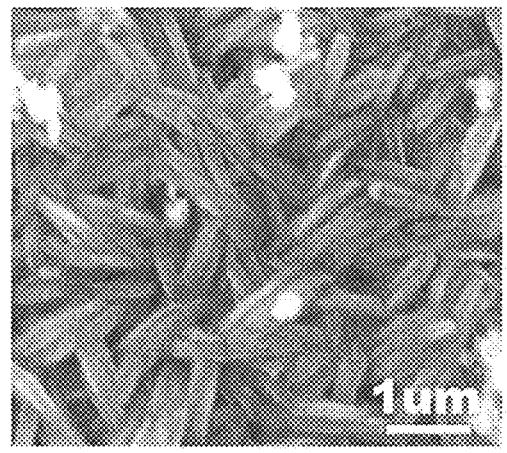
FIG. 16 is a SEM image of a surface microstructure of a sample membrane in Example 1.

The surface microstructure of the membrane sample was observed with a scanning electron microscope (SEM; JSM-6610LV, manufactured by JEOL Ltd.) at an acceleration voltage of 10 to 20 kV. FIG. 16 illustrates the resultant SEM image (i.e., a secondary electron image) of the surface microstructure of the membrane sample.

Figure 17:
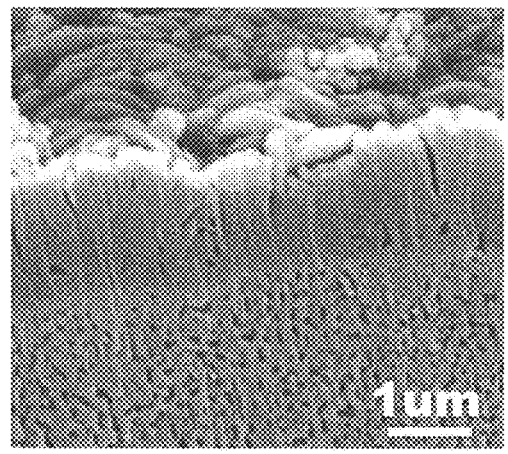
FIG. 17 is a SEM image of a microstructure at a polished cross-sectional surface of a composite material sample in Example 1.

A cross-section of the composite material sample was subjected to CP polishing, and the microstructure of the polished cross-section was observed with a scanning electron microscope (SEM) at an acceleration voltage of 10 to 20 kV. FIG. 17 illustrates the resultant SEM image of the microstructure of the polished cross-section of the composite material sample.

(5c) Measurement of Porosity

The porosity at the surface of the membrane sample was determined by a method involving image processing. Specifically, the porosity was determined as follows: 1) a scanning electron microscopic (SEM) image of the surface microstructure of the membrane was taken with a scanning electron microscope (SEM; JSM-6610LV, manufactured by JEOL Ltd.) (magnification: 10,000 or more) at an acceleration voltage of 10 to 20 kV; 2) the grayscale SEM image was read with image analysis software, such as Photoshop (manufactured by Adobe); 3) a monochromatic binary image was prepared by histogram thresholding with tools named [image], [color compensation], and [binarization] in this order; and 4) the porosity (%) was determined by dividing the number of pixels of the black areas by the number of all the pixels of the image. The porosity was determined over a 6 μm×6 μm area of the surface of the membrane. The porosity was 19.0%. This porosity was used to calculate the density D (hereinafter referred to as "membrane surface density") of the surface of the membrane by the expression: D=100%−(the porosity at the surface of the membrane). The density D was 81.0%.

The porosity at the polished cross-section of the membrane sample was also determined. The porosity was determined as in the above procedure except for taking an electron microscopic (SEM) image of the polished cross-section along the thickness of the membrane at a magnification of 10,000 or more (through the above procedure (5b)). The determination of the porosity was performed on the cross-section of the membrane portion in the oriented membrane sample. The porosity at the polished cross-section of the membrane sample was 3.5% on average (i.e., the average porosity of three polished cross-sections). The results demonstrate a significantly high density of the membrane formed on the porous substrate.

(5d) Density Evaluation Test I

Figure 18A:
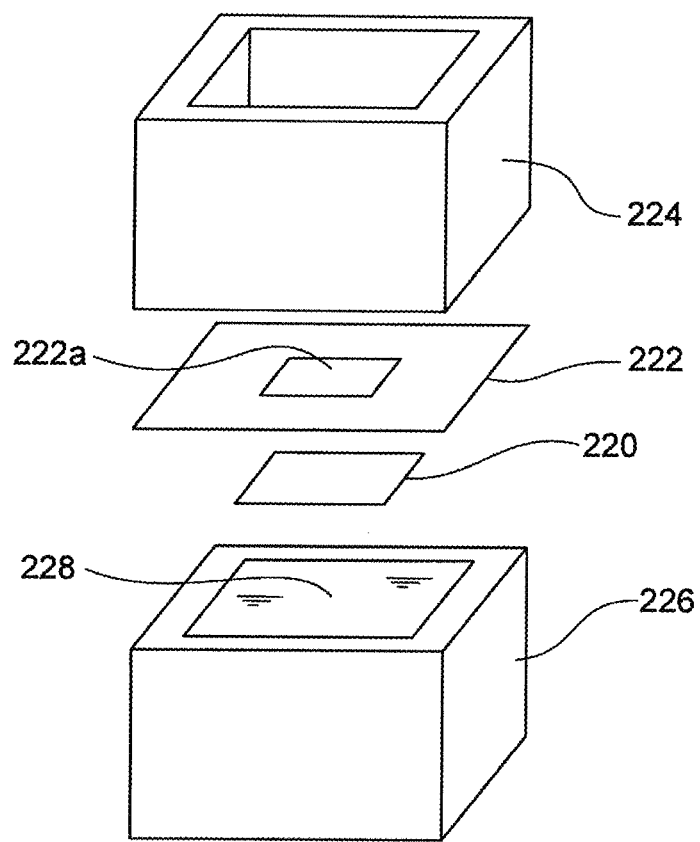
FIG. 18A is an exploded perspective view of a system for evaluating and measuring density in Example 1.
Figure 18B:
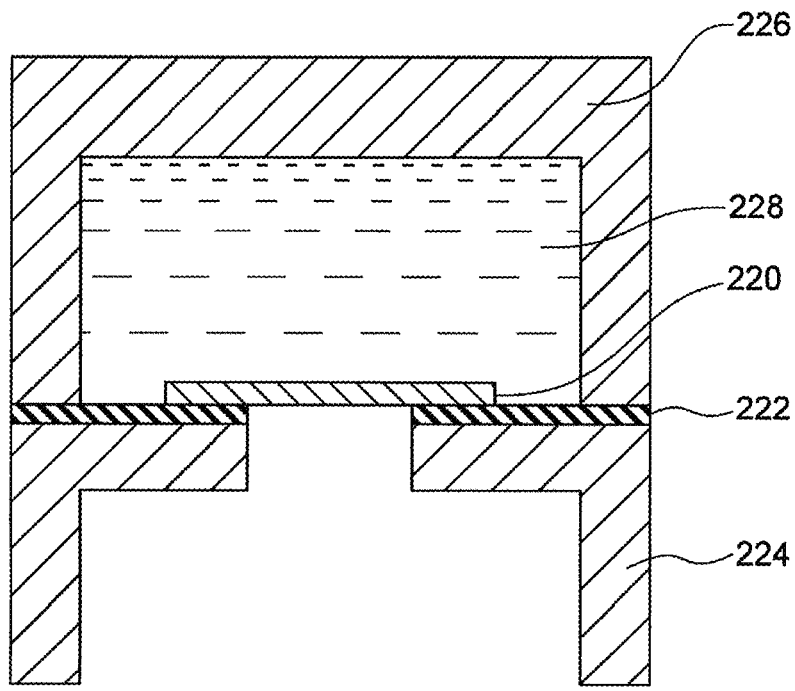
FIG. 18B a schematic cross-sectional view of a system for evaluating and measuring density in Example 1.

A density evaluation test was performed on the membrane sample for determining whether the sample has high density and thus water impermeability. With reference to FIG. 18A, a silicone rubber 222 having a central opening 222a (0.5 cm×0.5 cm) was bonded to the membrane sample of composite material sample 220 prepared in (1) above (cut into a piece of 1 cm×1 cm), and the resultant laminate was disposed between two acrylic units 224 and 226 and bonded to these acrylic units. The acrylic unit 224 disposed on the silicone rubber 222 has no bottom, and thus the silicone rubber 222 is bonded to the acrylic unit 224 such that the opening 222a is exposed. The acrylic unit 226 disposed on the porous substrate side in view of composite material sample 220 has a bottom and contains ion-exchange water 228. In this case, Al and/or Mg may be dissolved in the ion-exchange water. Thus, these components are arranged to form an assembly such that the ion-exchange water 228 comes into contact with the porous substrate of composite material sample 220 if the assembly is inverted upside down. After formation of the assembly, the total weight thereof was measured. It goes without saying that the unit 226 has a closed vent (not shown) and the vent is opened after inversion of the assembly. As illustrated in FIG. 18B, the assembly was inverted and left for one week at 25° C., and then the total weight thereof was measured again. Before measurement of the weight of the assembly, water droplets on the inner side(s) of the acrylic unit 224 were wiped off, if any. The density of the membrane sample was evaluated on the basis of the difference between the total weights of the assembly before and after the inversion. No change in weight of the ion-exchange water was observed even after the one-week test at 25° C. The results demonstrate that the membrane sample (i.e., functional membrane) exhibits high density and thus water impermeability.

(5e) Density Evaluation Test II

Figure 19A:
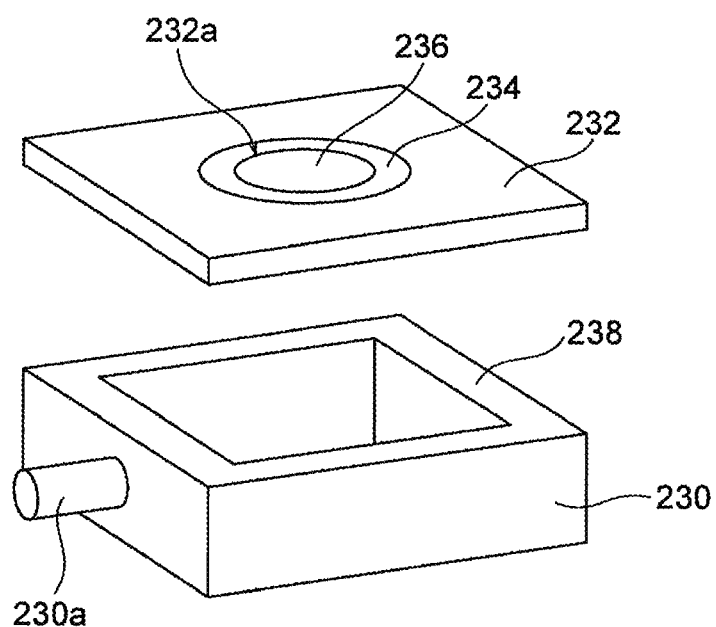
FIG. 19A is an exploded perspective view of a hermetic container used in density evaluation test II in Example 1.
Figure 19B:
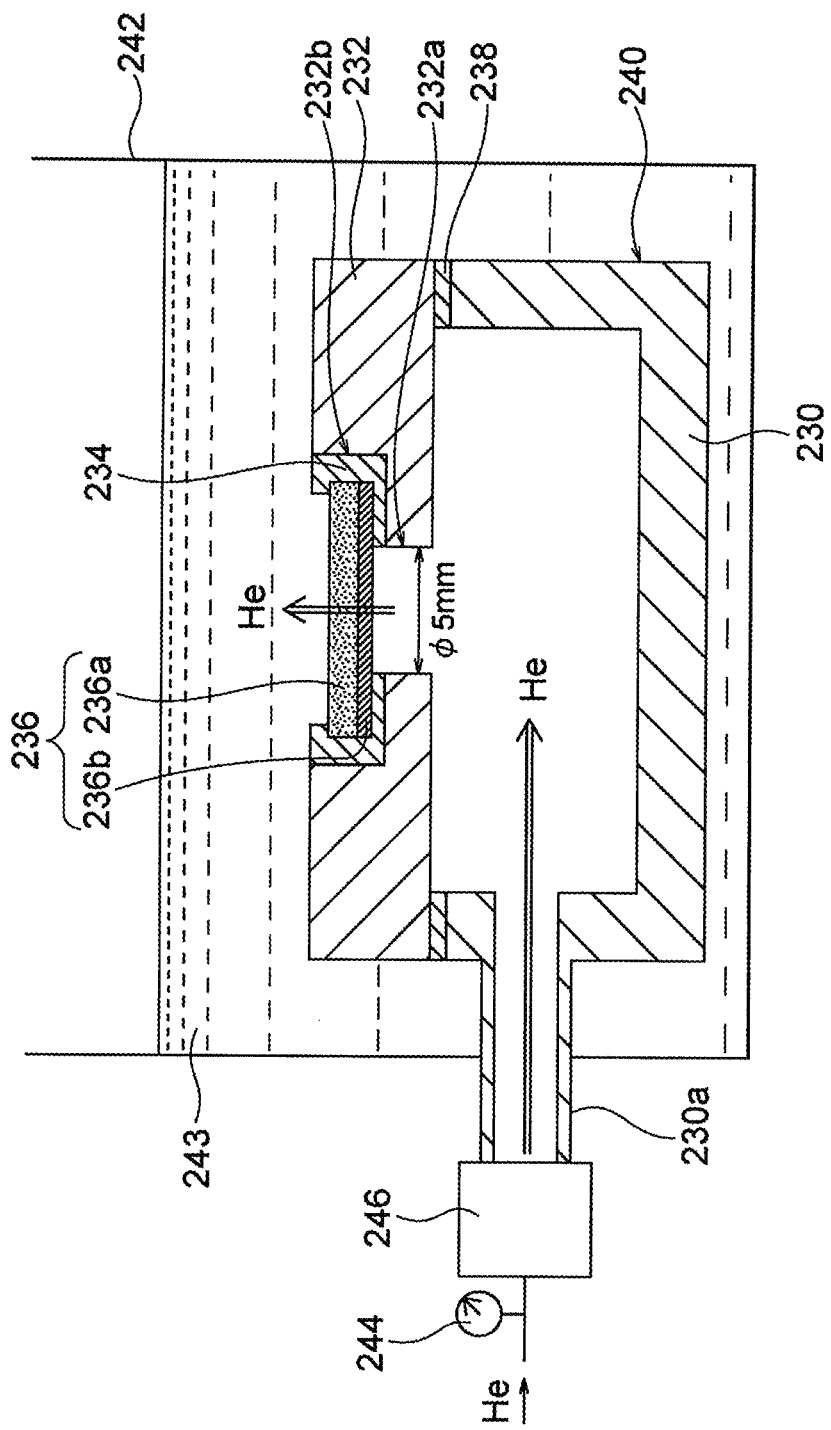
FIG. 19B is a schematic cross-sectional view of a system used in density evaluation test II in Example 1.

A density evaluation test was performed on the membrane sample for determining whether the sample has high density and thus gas impermeability. As illustrated in FIGS. 19A and 19B, an acrylic container 230 and an alumina jig 232 were provided. The container 230 has no lid, and the jig 232 has a shape and a size such that it serves as a lid for the container 230. The acrylic container 230 has a gas inlet 230a for feeding a gas into the container 230. The alumina jig 232 has an opening 232a having a diameter of 5 mm, and a dent 232b provided around the opening 232a for supporting the membrane sample. An epoxy adhesive 234 was applied to the dent 232b of the alumina jig 232, and a membrane sample 236b of a composite material sample 236 was placed on the dent 232b and gas- and liquid-tightly bonded to the alumina jig 232. The alumina jig 232 provided with the composite material sample 236 was gas- and liquid-tightly bonded to the upper edge of the acrylic container 230 with a silicone adhesive 238 so as to completely cover the opening of the acrylic container 230, to prepare a hermetic container 240 for evaluation. The hermetic container 240 was placed in a water bath 242, and the gas inlet 230a of the acrylic container 230 was connected to a pressure gauge 244 and a flowmeter 246 so as to allow helium gas to be fed into the acrylic container 230. Water 243 was poured into the water bath 242 such that the hermetic container 240 was completely submerged in the water. The hermetic container 240 was ensured to have gas tightness and liquid tightness. The membrane sample 236b of the composite material sample 236 was exposed to the inner space of the hermetic container 240, and the porous substrate 236a of the composite material sample 236 was in contact with the water in the water bath 242. Helium gas was fed into the hermetic container 240 through the gas inlet 230a of the acrylic container 230. The pressure gauge 244 and the flowmeter 246 were monitored to achieve a differential pressure of 0.5 atm at the membrane sample 236b (i.e., the pressure applied to the surface in contact with helium gas was higher by 0.5 atm than water pressure applied to the opposite surface), to determine the presence of helium gas bubbles in the water caused by permeation of helium gas through the composite material sample 236. No helium gas bubbles were observed. The results demonstrate that the membrane sample 236b has high density and thus gas impermeability.

Example 2 (Reference): Production and Evaluation of Nickel-Zinc Battery

Example 2 is a reference example based on a unit cell including a single set of a positive electrode plate, a separator, and a negative electrode plate.
(1) Preparation of Separator with Porous Substrate
A separator provided with a porous substrate (LDH membrane on alumina substrate) (size: 5 cm×8 cm) was prepared as in Example 1.
(2) Preparation of Positive Electrode Plate
Particulate nickel hydroxide containing zinc and cobalt in the form of solid solution was prepared. The particulate nickel hydroxide was coated with cobalt hydroxide to yield a positive-electrode active material. The positive-electrode active material was mixed with a 2% aqueous carboxymethyl cellulose solution to prepare a paste. The paste was evenly applied to a current collector composed of a nickel porous substrate having a porosity of about 95% and dried so that the porosity of the positive-electrode active material was 50% to prepare a positive electrode plate having a region of 5 cm×5 cm coated with the active material. The amount of coating was adjusted so that the active material contained particulate nickel hydroxide corresponding to 4 Ah.
(3) Preparation of Negative Electrode Plate
A mixture of powdery zinc oxide (80 parts by weight), powdery zinc (20 parts by weight), and particulate polytetrafluoroethylene (3 parts by weight) was applied onto a current collector composed of punched copper sheet, to prepare a negative electrode plate having a porosity of about 50% and a region of 5 cm×5 cm coated with the active material. The amount of coating was adjusted so that the active material contained powdery zinc oxide corresponding to a positive electrode plate capacity of 4 Ah.
(4) Assembly of Battery
The positive electrode plate, the negative electrode plate, and the separator provided with the porous substrate were assembled as described below into a nickel-zinc secondary battery illustrated in FIG. 9.
A rectangular parallelepiped casing composed of ABS resin and having no lid was provided. The separator provided with the porous substrate (LDH membrane on alumina substrate) was placed near the center of the casing, and three edges of the separator were fixed to the inner wall of the casing with an epoxy-resin adhesive (EP008, manufactured by CEMEDINE Co., Ltd.). The positive electrode plate and the negative electrode plate were placed in a positive-electrode chamber and a negative-electrode chamber, respectively. The positive electrode plate and the negative electrode plate were disposed so that a positive-electrode current collector and a negative-electrode current collector came into contact with the inner wall of the casing. A 6 mol/L aqueous KOH solution, serving as an electrolytic solution, was injected into the positive-electrode chamber in an amount such that the region coated with the positive-electrode active material was completely submerged in the solution. The liquid level of the electrolytic solution in the positive-electrode chamber was about 5.2 cm from the bottom of the casing. A 6 mol/L aqueous KOH solution, serving as an electrolytic solution, was injected into the negative-electrode chamber in an amount such that the region coated with the negative-electrode active material was completely submerged in the solution. The amount of the electrolytic solution was adjusted so as to meet the amount of water that will decrease during a charge mode. The liquid level of the electrolytic solution in the negative-electrode chamber was about 6.5 cm from the bottom of the casing. The terminals of the positive-electrode current collector and the negative-electrode current collector were connected to external terminals provided at the top of the casing. A lid for the casing was fixed to the casing by thermal bonding to hermetically seal the battery casing. The nickel-zinc secondary battery was thereby produced. In the battery, the separator had a width of 5 cm and a height of 8 cm, and the region of the positive or negative electrode plates coated with the active material had a width of 5 cm and a height of 5 cm. Thus, an upper space of the positive-electrode or negative electrode chamber corresponding to a difference in height of 3 cm was respectively an extra positive-electrode or negative-electrode space.
(5) Evaluation
The resultant nickel-zinc secondary battery was subjected to constant-current charging for 10 hours (design capacity: 4 Ah, current: 0.4 mA corresponding to 0.1 C). Neither the deformation of the casing nor the leakage of the electrolytic solution was observed after the charging. The liquid level of the electrolytic solution was observed after the charging. The liquid level of the electrolytic solution in the positive-electrode chamber was about 7.5 cm from the bottom of the casing, and the liquid level of the electrolytic solution in the negative-electrode chamber was about 5.2 cm from the bottom of the casing. Although the amount of the electrolytic solution increased in the positive-electrode chamber and the amount of the electrolytic solution decreased in the negative-electrode chamber through the charging, the region coated with the negative-electrode active material was immersed in a sufficient amount of the electrolytic solution. Thus, the electrolytic solution was retained in the casing in an amount sufficient for the charge/discharge reaction of the coated positive-electrode active material and negative-electrode active material through charge/discharge of the battery. Sufficient adhesion was maintained between the separator provided with the porous substrate and the rectangular parallelepiped casing composed of ABS resin.

Example 3: Solvent Bonding of ABS Resin

Figure 20:
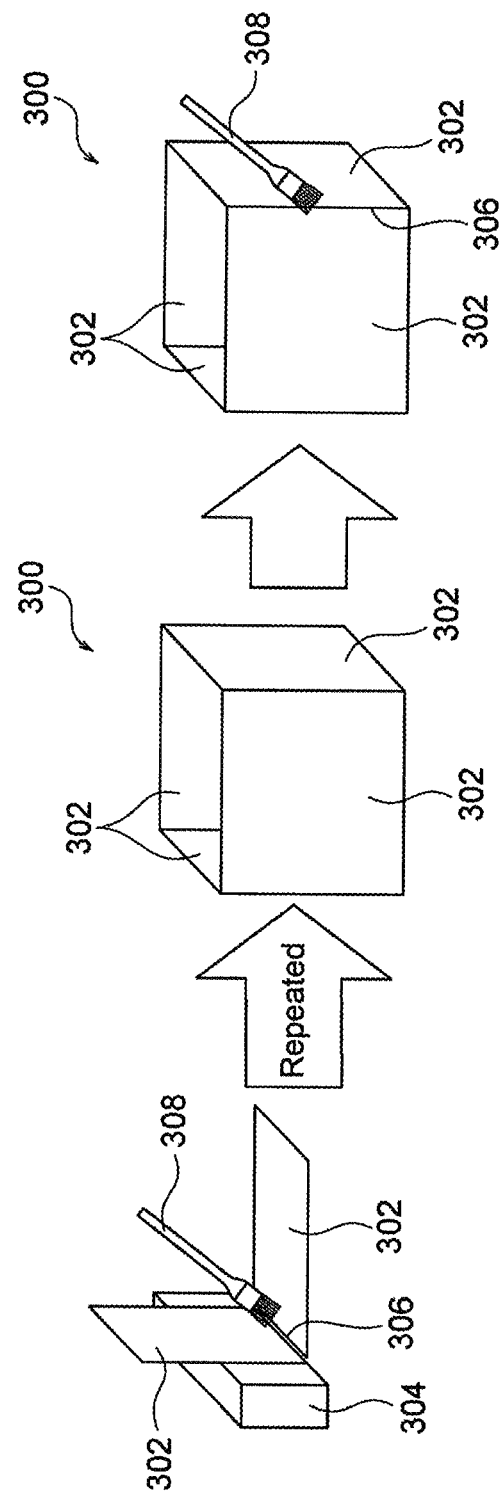
FIG. 20 is a process chart illustrating a process of producing a box container by solvent bonding of resin plates in Examples 3 and 4.
Figure 21:
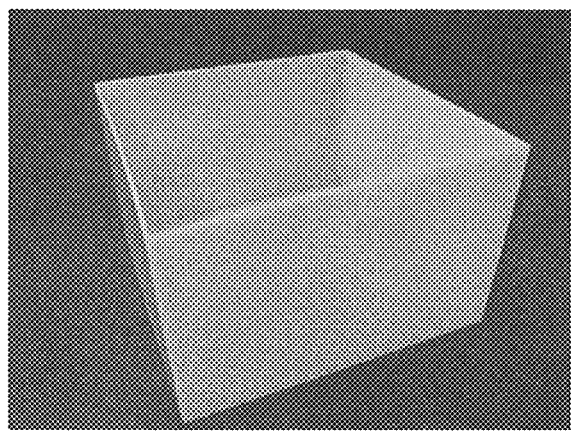
FIG. 21 is a photograph of a box-shaped container of ABS resin produced by solvent bonding in Example 3.

Five ABS resin plates with a thickness of 1 mm were joined by solvent bonding into a box container. More specifically, two resin plates 302 were fixed together with a zig 304 such that the edges of the resin plates 302 were in contact with each other at an angle of 90 degrees, methyl ethyl ketone (MEK) solvent was applied to the joint portion 306 between the resin plates 302 with a brush 308, and then a solvent was poured into the gap in the joint portion, as shown in FIG. 20. In the present Example, the two resin plates 302 were tightly fixed together so as to reduce the gap in the joint portion 306, and then the solvent was poured therein. As a result, the solvent spread in and around the gap due to capillary action. Such a procedure was repeated until the five resin plates 302 were mutually solvent-bonded. The box container 300 shown in FIG. 20 was thereby produced. Finally, it was confirmed whether a gap due to inadequate bonding was present at the joint portions 306. If such a gap was found, the solvent was applied again with the brush 308 to repair the bond. FIG. 21 shows a photograph of the resulting box container. FIG. 21 demonstrates that the five resin plates are sufficiently sealed and tightly bonded without any gap.

Example 4: Solvent Bonding of PET Resin

Figure 22A:
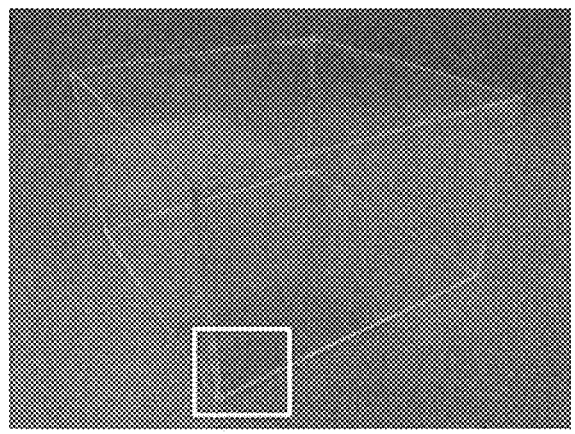
FIG. 22A is a photograph of a box-shaped container of PET resin produced by solvent bonding in Example 3.
Figure 22B:
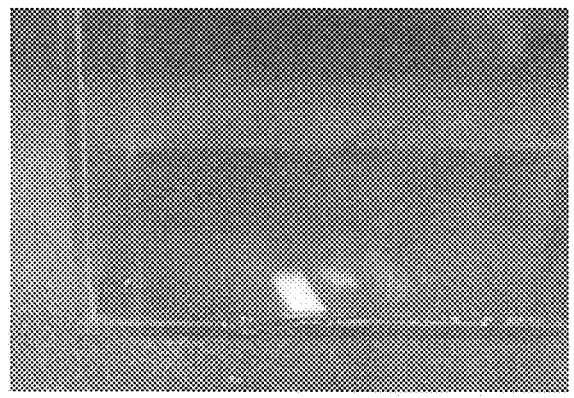
FIG. 22B is an enlarged photograph of the area in the white frame in FIG. 22A.

A box battery container was produced by solvent bonding as in Example 3, except that the five ABS resin plates were replaced with five PET resin plates having a thickness of 1 mm and methyl ethyl ketone (MEK) was replaced with dichloromethane. FIG. 22A shows a photograph of the thus produced box container. FIG. 22B is an enlarged photograph of the area in the white frame in FIG. 22A. FIGS. 22A and 22B demonstrate that the five resin plates are sufficiently sealed and tightly bonded without any gap.

Example 5: Preparation of a Casing for Layered Battery by Solvent Bonding

Figure 23A:
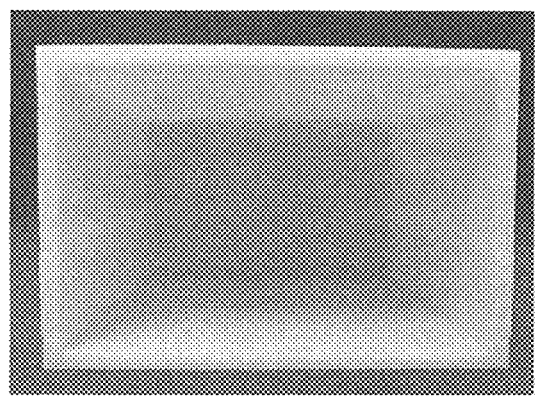
FIG. 23A is a photograph taken from above of a casing for stacked-cell battery produced by solvent bonding in Example 3.
Figure 23B:
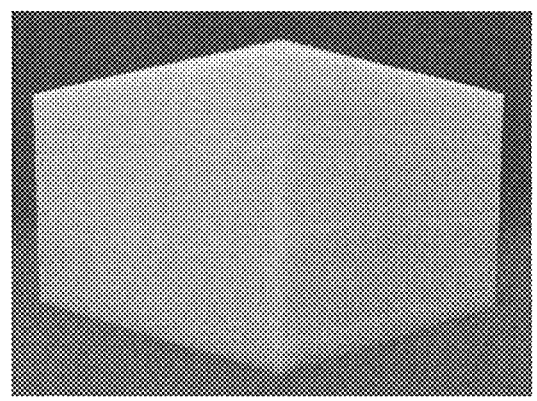
FIG. 23B is a photograph taken from the side of the casing for stacked-cell battery produced by solvent bonding in Example 3.
Figure 23C:
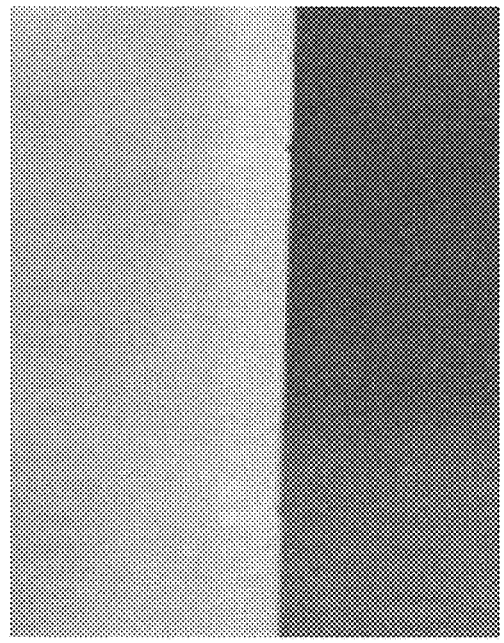
FIG. 23C is an enlarged photograph of a joint portion of the casing for stacked-cell battery produced by solvent bonding in Example 3.

Six resin components including four U-shaped frames of ABS resin having a thickness of 2.5 mm and two end face plates of ABS resin having a thickness of 2.5 mm were joined by solvent bonding into a casing for stacked-cell battery. More specifically, the four U-shaped frames were stacked and bonded in sequence on one of the end face plate, and then the other of the end face plate was bonded to the side of the stack opposite to the previously bonded end face plate. The resin components were bonded by applying methyl ethyl ketone (MEK) solvent to the joint portions of the resin components with a brush. FIGS. 23A and 23B are photographs taken from above and the side, respectively, of the resulting casing for stacked-cell battery, and FIG. 23C is an enlarged photograph of a joint portion of the casing. FIGS. 23A to 23C demonstrate that the four resin frames and the two resin end face plates are sufficiently sealed and tightly bonded without any gap.

What is claimed is:

1. A battery comprising:
   one or more positive electrode plates;
   one or more negative electrode plates provided oppositely to and/or alternately with the positive electrode plates;
   an electrolytic solution containing an aqueous alkali metal hydroxide;
   one or more separator structures, each provided between one of the positive electrode plates and the adjacent negative electrode plate to separate the positive and negative electrode plates and comprising a separator exhibiting hydroxide ion conductivity and water impermeability; and
   a battery container containing the positive and negative electrode plates, the separator structures, and the electrolytic solution,
   wherein the battery container comprises two end face plates and a plurality of frames which are connected to each other between the two end face plates to ensure liquid tightness; and
   wherein the positive and negative electrode plates are disposed between the two end face plates and are separated by each separator structure, such that the periphery of each separator structure is held between two adjacent frames; and the positive or negative electrode plates are disposed within a region defined by the frames and between the separator structures and the end face plates and/or between the two adjacent separator structures.

2. The battery according to claim 1, wherein the positive electrode plate comprises a positive-electrode active material and a positive-electrode current collector supporting the positive-electrode active material, and the negative electrode plate comprises a negative-electrode active material and a negative-electrode current collector supporting the negative-electrode active material.

3. The battery according to claim 2, wherein the positive-electrode current collector comprises a positive-electrode current collector extension protruding to the outside of the battery container, and the negative-electrode current collector comprises a negative-electrode current collector extension protruding to the outside of the battery container.

4. The battery according to claim 2, wherein the positive-electrode active material comprises nickel hydroxide and/or nickel oxyhydroxide, and the negative-electrode active material comprises zinc, a zinc alloy, and/or a zinc compound, such that the battery is configured in the form of a nickel-zinc battery.

5. The battery according to claim 1, wherein the periphery of the separator structure is bonded to the frame to ensure liquid tightness.

* * * * *